(12) United States Patent
Suzuki et al.

(10) Patent No.: US 6,469,301 B1
(45) Date of Patent: Oct. 22, 2002

(54) RADIATION DETECTORS INCLUDING THERMAL-TYPE DISPLACEABLE ELEMENT WITH INCREASED RESPONSIVENESS

(75) Inventors: Junji Suzuki; Tohru Ishizuya, both of Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/570,767

(22) Filed: May 12, 2000

(30) Foreign Application Priority Data

| May 14, 1999 | (JP) | ............................................ | 11-134143 |
| Jul. 27, 1999 | (JP) | ............................................ | 11-212740 |

(51) Int. Cl.⁷ .................................................. G01J 5/20
(52) U.S. Cl. ................................. 250/338.1; 250/336.1
(58) Field of Search ........................... 250/338.1, 338.4, 250/332, 336.1, 339.02

(56) References Cited

U.S. PATENT DOCUMENTS

| 3,896,309 | A |   | 7/1975 | Halsor et al. |           |
| 5,623,147 | A |   | 4/1997 | Baert et al. |            |
| 5,844,238 | A |   | 12/1998 | Sauer et al. |           |
| 5,929,440 | A | * | 7/1999 | Fisher ...................... | 250/338.1 |
| 5,965,886 | A |   | 10/1999 | Sauer et al. |           |
| 6,080,988 | A |   | 6/2000 | Ishizuya et al. |       |
| 6,140,646 | A | * | 10/2000 | Busta et al. ............. | 250/338.1 |
| 6,201,243 | B1 | * | 3/2001 | Jerominek ................ | 250/338.1 |

FOREIGN PATENT DOCUMENTS

| JP | 8-193881 | 7/1996 |
| JP | 8-354812 | 12/1996 |
| JP | 9-013089 | 1/1997 |
| JP | 9-082121 | 3/1997 |
| JP | 9-256042 | 9/1997 |

OTHER PUBLICATIONS

Barnes et al, Photothermal spectroscopy woth femtojoule sensitivity using a micromechanical device, Nature, 372(3), Nov. 1997, pp. 79–81.*

Zaeschmar et al., "Theory of the Optical Properties of Gold Blacks," *J. Opt. Soc. Am.* 62:348–352 (1972).

* cited by examiner

*Primary Examiner*—Georgia Epps
*Assistant Examiner*—Richard Hanig
(74) *Attorney, Agent, or Firm*—Klarquist Sparkman LLP

(57) ABSTRACT

Radiation detector arrays are provided that include one or more thermal-type displaceable elements having reduced thickness without compromising mechanical strength or sensitivity of the displaceable elements to incident radiation. An exemplary displaceable element includes first and second membrane layers made of materials having different coefficients of thermal expansion. The layers are supported relative to a substrate by a leg. The displaceable element can also serve as an absorbing member for the incident radiation to be detected. Each element can also include a reflector of signal light. When the displaceable element incident radiation (such as infrared radiation) to be detected, it undergoes heating which bends the element. Displacement of the element is detected as a change in signal light or as a change in capacitance. If the displaceable member includes a signal-light reflector, the reflector includes a planar portion including "dropped" edges serving to strengthen the planar portion and allow the thickness of the planar portion to be reduced.

23 Claims, 22 Drawing Sheets

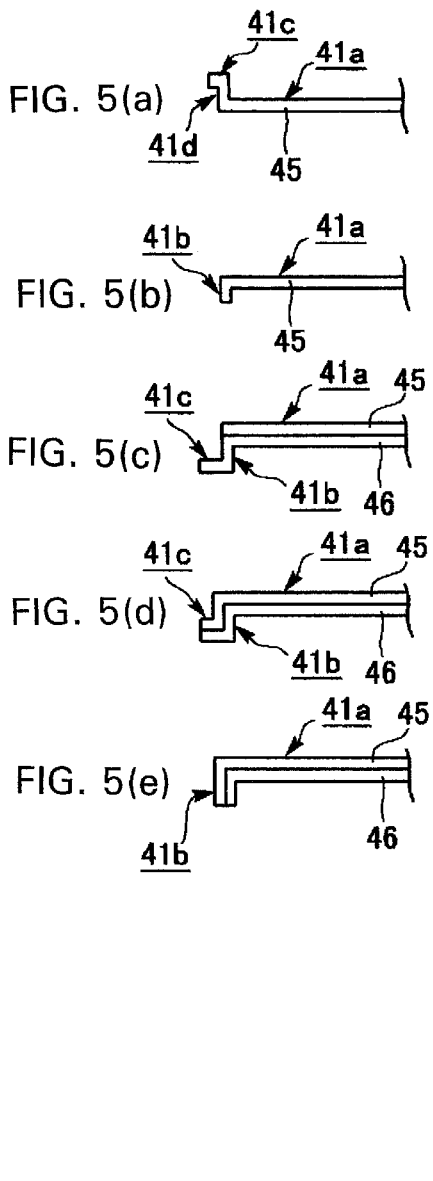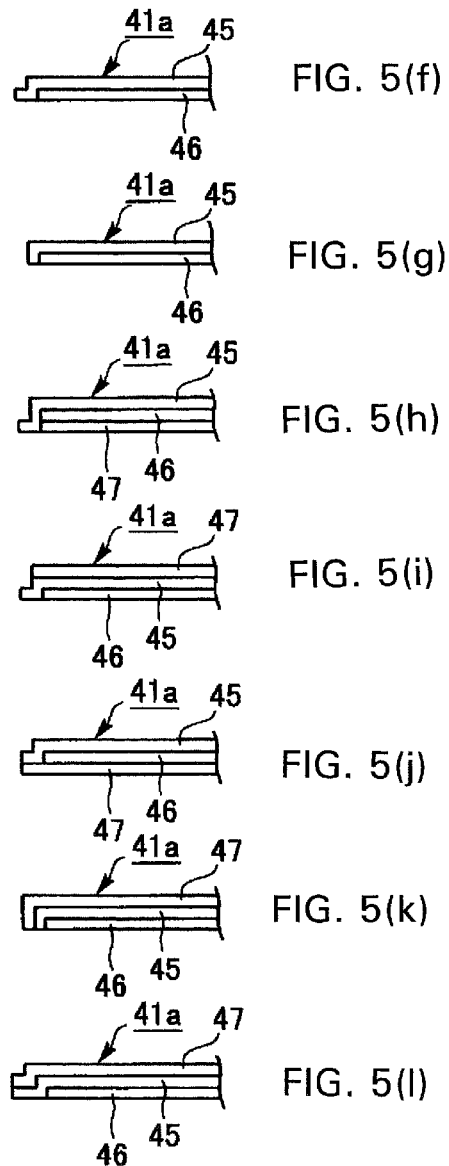

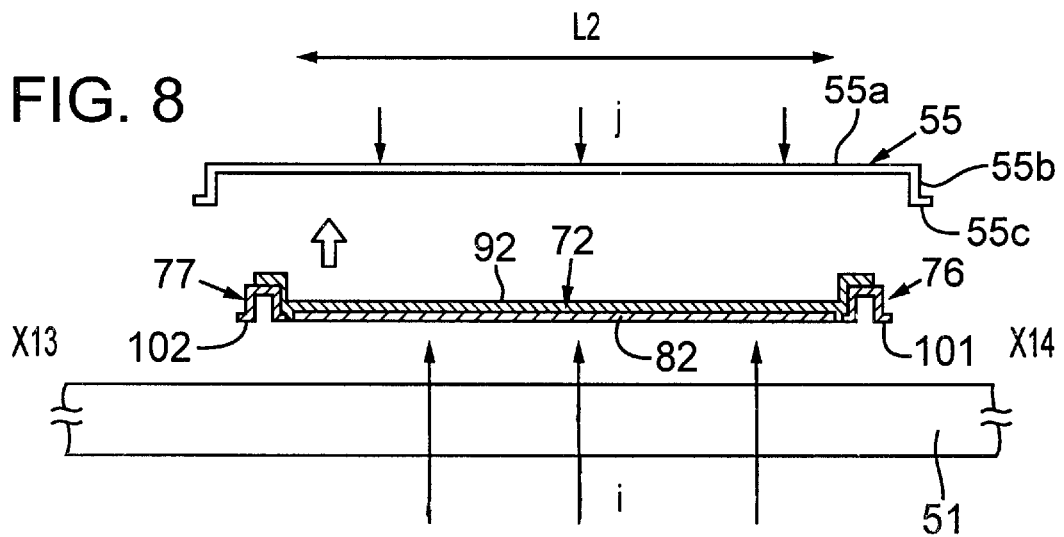
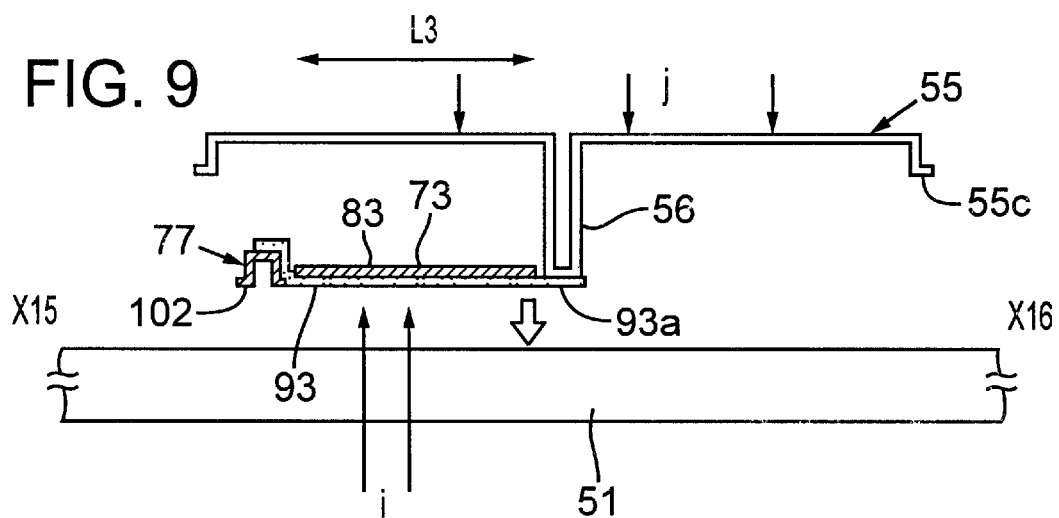
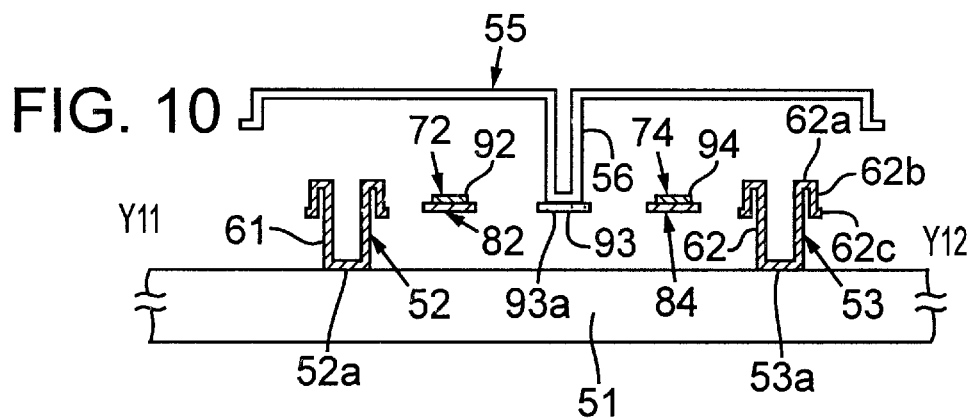

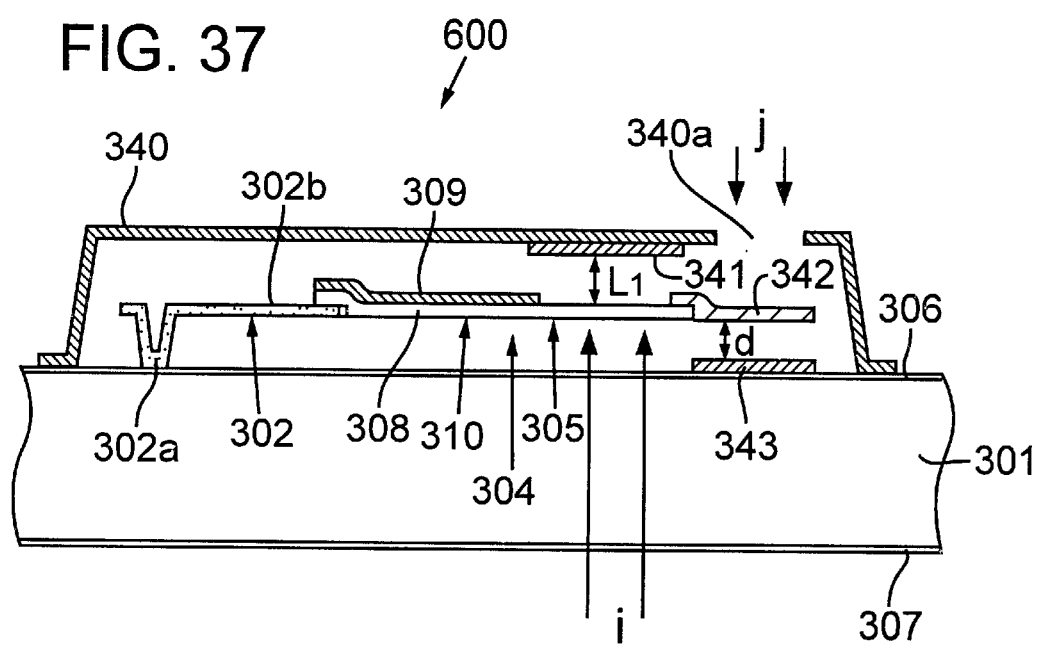
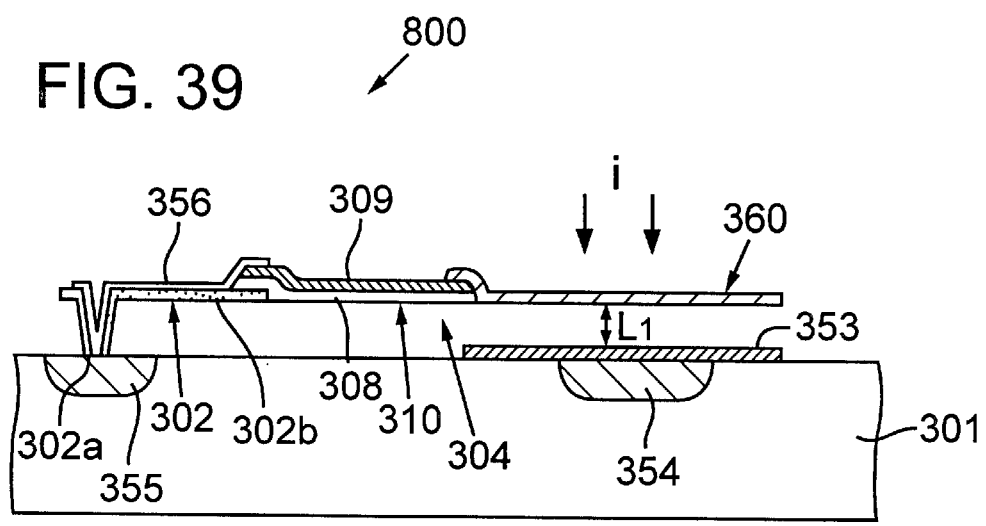

RADIATION DETECTORS INCLUDING THERMAL-TYPE DISPLACEABLE ELEMENT WITH INCREASED RESPONSIVENESS

FIELD OF THE INVENTION

The present invention relates to, inter alia, radiation-sensing detectors comprising one or more individual detector elements ("pixels") each including a thermally displaceable member. Incident radiation such as infrared radiation is locally absorbed and converted to heat by the thermally displaceable elements, causing the thermally displaceable elements to individually exhibit a corresponding thermal displacement. The displacements impart corresponding changes to a signal light or other detectable entity.

BACKGROUND OF THE INVENTION

Conventional infrared-sensor panels include an array of a large number of individual sensor elements ("pixels"). Each pixel comprises a membrane portion that includes a planar surface made from one or more membrane layers. The membrane portion is suspended in space relative to a respective substrate in the manner of, e.g., a cantilever, and typically is made using micro-machining technology such as technology used in the manufacture of semiconductor integrated circuits.

For example, one type of conventional pixel in such an array includes a displaceable membrane member that is supported relative to a substrate by a leg portion. The displaceable membrane member includes a radiation-absorbing region. As the radiation-absorbing region absorbs incident electromagnetic radiation (e.g., infrared (IR) radiation), the displaceable membrane member exhibits a corresponding displacement relative to the substrate. Such elements have been incorporated into capacitor-based as well as light-based thermal-type IR detectors. See, e.g., U.S. Pat. Nos. 3,896,309 and 5,844,238; and U.S. patent application Ser. No. 08/994,949, now U.S. Pat. No. 6,080,988. In other conventional applications, the membrane member has been incorporated into the leg portion of a thermal-type displaceable element. A capacitor-based radiation detector reads out displacements to individual constituent pixels (caused by incident radiation) as respective changes of capacitance. A light-based radiation detector reads out displacement to individual constituent pixels (caused by incident radiation) as respective changes in a read-out (signal) light.

According to conventional practice, the membrane member typically includes a planar-surface portion formed from at least one layer having a desired planar configuration. In such a configuration, it is desirable that the membrane portion be as thin as possible to reduce the mass of the displaceable membrane member and thus to improve responsivity. However, conventional approaches exploited to achieve this end are not satisfactory.

In a radiation detector such as an IR detector, the rate at which incident radiation is absorbed by each pixel desirably is high to enhance detection sensitivity. It also is desirable that the thermal capacity of the radiation-absorbing region of each pixel be as small as practicable to enhance detection response. It also is desirable that the heat generated in each radiation-absorbing region be efficiently and effectively conducted to the respective displaceable member to enhance detection sensitivity.

In a conventional radiation detector, even if a gold-black membrane exhibiting a relatively high rate of radiation absorption rate is used as the radiation-absorbing region, it has not been possible to date to enhance both detection sensitivity and detection response of the pixels. More specifically, the rate of radiation absorption exhibited by gold black is, for example, about 960 $cm^{-1}$ with incident IR radiation having a wavelength in the range of 8 to 12 $\mu m$. Zaeschmar and Nedoluha, "Theory of the Optical Properties of Gold Blacks," *J. Am. Opt. Soc.* 62(3):348–352, March 1972. The efficiency with which gold black (formed as a 1-$\mu m$ thick membrane) absorbs infrared radiation is only about 9%. Increasing the efficiency can be achieved by increasing the thickness of the gold-black membrane. However, this remedy leads to other problems. Conventionally, it is impossible both to reduce the membrane thickness while simulaneously enhancing the rate of absorption of IR radiation simply by forming the membrane in a manner such that the incident radiation merely enters the membrane. Hence, it is currently impossible to enhance both detection sensitivity and detection response of these detectors.

SUMMARY OF THE INVENTION

In view of the shortcomings of the prior art as summarized above, an object of the present invention is to provide, for a radiation detector, a displaceable structure of which the thickness (and thus the mass) can be reduced while maintaining a desired mechanical strength of the displaceable structure. Another object is to provide a thermal-type displaceable element, and a radiation detector comprising one or more such elements, exhibiting enhanced image-sensing performance while maintaining a desired mechanical strength and reducing the thickness of the displaceable element.

According to one aspect of the invention, a radiation detector is provided that includes a displaceable member. The displaceable member comprises a planar portion comprising at least one membrane layer. The planar portion is supported so as to be suspended over a substrate of the detector. The planar portion includes a "dropping portion" or "rising portion" extending along at least a portion of the periphery of the planar portion. The planar portion can be fabricated using a semiconductor-fabrication process. The dropping or rising portion desirably is formed of at least one layer of the planar portion.

By placing the dropping or rising portion around at least a portion of the periphery of the planar portion, the planar portion is structurally reinforced by the dropping or rising portion. This structural reinforcement allows the thickness (and thus the mass) of the planar portion to be reduced without compromising its mechanical strength. Also, the dropping or rising portion helps maintain uniformity of the planar portion, even if the planar portion is formed of multiple membrane layers.

If the planar portion is formed of multiple membrane layers, it can be peripherally edged in a manner in which at least one of the layers covers the peripheral edge of at least one of the other layers. Such a structure can be fabricated using a semiconductor-fabrication process. Because the planar portion is structurally reinforced by the covered edge of at least one layer, the thickness (and thus the mass) of the planar portion can be reduced without compromising the mechanical strength of the planar portion.

Furthermore, even if the planar portion would otherwise tend to exhibit a displacement due to any difference in the coefficients of thermal expansion of the layers making up the planar portion, such displacement is arrested by the strength imparted by the covered peripheral edges.

A thermal-type displaceable element of a radiation detector according to the invention can comprise a leg serving to connect the displaceable element to the substrate and to suspend the displaceable element over a corresponding region of the substrate. The leg can comprise at least one membrane layer and can be fabricated as an extension of the planar portion. The leg desirably has a thermal-insulation property. The greater the thermal insulation provided by the leg, the greater the displacement that can be imparted to the displaceable element. The leg also can include a dropping portion extending around a planar portion of the leg, so as to provide the leg with enhanced structural rigidity while allowing the membrane thickness of the leg to be reduced. By reducing the thickness of the leg, its thermal-insulation property can be enhanced.

The radiation detector can comprise a thermal-type displaceable element comprising a displaceable portion that is displaced according to heat generated by incident light (e.g., IR light). The displaceable portion is displaced (e.g., tilted) by an amount corresponding to the amount of generated heat. As an alternative to IR radiation, the detector can be configured to undergo heating in response to other wavelengths of light such as X-rays, ultraviolet rays, etc. By maintaining good thermal insulation between the substrate and the displaceable portion, the actual displacement exhibited by the displaceable portion is an accurate function of the amount of incident radiation actually received, thereby providing an improved signal-to-noise (S/N) level to the detector.

In a representative embodiment, the radiation detector includes a substrate, a displaceable member supported relative to the substrate and exhibiting a displacement relative to the substrate in response to heat. The displaceable member includes a displacement readout member fixed thereto. The displacement readout member is used for measuring the displacement of the displaceable member. The displacement readout member can be arranged at a predetermined distance from the displaceable member and can be formed from the same membrane layer(s) as the displaceable member. By forming the displacement readout member from the same membrane(s) as the displaceable member, the thickness of the displacement readout member can be reduced while maintaining the mechanical strength of the displaceable readout member.

The displaceable member typically comprises at least two mutually overlapping layers of different substances having different coefficients of thermal expansion. The thinner the layers, the greater the displacement that can be achieved with a given change in temperature. Thus, the sensitivity of the detector is correspondingly increased.

The displacement readout member can be a reflector configured to reflect incident readout light. Alternatively, the displacement readout member can be an electrode of a capacitor structure. A configuration including a reflector is termed a "light-readout radiation detector." A configuration including an electrode is termed a "capacitor-type radiation detector." These configurations, however, are not to be construed as limiting in any way.

A radiation detector according to the invention normally includes multiple detection elements ("pixels"). The pixels can be arranged in a one-dimensional or two-dimensional array. A two-dimensional array is especially useful for detecting an image in the incident radiation.

According to one embodiment, a radiation detector according to the invention can be formed as follows. Each pixel comprises a respective "displaceable structure" comprising multiple independently displaceable members configured as a multiple-stage displaceable structure. Each of the independently displaceable members is linearly extended and includes two or more mutually overlapping layers of different substances having different thermal expansion coefficients. The independently displaceable members are arranged parallel to each other. The ends of the independently displaceable members are connected either to the substrate or to "connecting members" so as to form a single integral (but nevertheless multiple-stage) mechanical linkage from the substrate to a displaceable readout member supported by the displaceable structure. With such a configuration, large displacements can be obtained with minimal space per pixel on the substrate.

Alternatively, the displaceable structure of each pixel can comprise only a single displaceable element. However, by configuring the displaceable structure to have multiple independently displaceable members connected together using connecting members as summarized above, a displacement substantially the same as otherwise obtainable with a displaceable structure including only a single independently displaceable member having a length equal to the total length of the independently displaceable members can be obtained. Hence, the configuration including multiple independently displaceable members provides a greater degree of freedom.

The connecting members can be configured to have at least one membrane layer and can be configured with strength-enhancing features as summarized above. Such configurations allow the membrane thicknesses of the connecting members to be reduced without compromising mechanical strength of the connecting members. This allows the mass of the connecting members to be reduced, thereby allowing the mass of independently displaceable members connected thereto to be reduced. These mass reductions provide enhanced detector sensitivity.

A thermal-type displacement element according to another embodiment includes a displaceable structure mounted to the substrate and that is displaceable relative to the substrate in response to heat. The displaceable structure includes multiple independently displaceable members. Each independently displaceable member extends in a straight line and includes two or more mutually overlapping layers of different substances having different thermal expansion coefficients. The independently displaceable members are arranged in parallel. Certain independently displaceable members are affixed to the substrate via a respective leg. Other independently displaceable members are connected to the members connected to the substrate or to each other to form a single intregral mechanical connection. Each leg can be composed of a membrane layer. With such an embodiment, even if plural pixels are arranged on the substrate, large displacements can be obtained with minimal substrate space being occupied by each pixel.

In the foregoing configuration, the legs can be formed from the membrane structure of an independently displaceable element. This allows the layer thickness of the leg to be reduced without compromising mechanical strength of the leg. This, in turn, provides for improved thermal insulation by the leg between the substrate and the displaceable structure.

Furthermore, the coefficients of thermal expansion of the layers comprising the independently displaceable members desirably are arranged in opposite order with each "stage" of the linkage. With such a configuration, the total displacement is about the same magnitude as it otherwise would be if the displaceable structure only comprised one independently displaceable member having a length equal to the combined lengths of such members in the multiple-stage configuration.

In the multiple-stage configuration, the final stage can terminate with a displacement readout member exhibiting a change to a readout medium (e.g., readout light) commensurate with the amount of displacement exhibited by the displaceable structure. In addition, the independently displaceable members in the displaceable structure can be configured to absorb incident radiation and generate heat that effects the displacement of the structure.

A thermal-type displaceable element as summarized above, or any of various other configurations of such elements according to the invention, need not necessarily be used in a radiation detector. They alternatively can be used as a simple sensor for detecting, for example, a temperature distribution.

Furthermore, although a displaceable structure as summarized above is especially suitable for use in a thermal-type displaceable element or in a radiation detector, the structure also can be used for any of various other applications such as micro-machines.

According to yet another aspect of the invention, radiation detectors are provided that include a substrate and a displaceable structure supported relative to the substrate. The displaceable structure includes a radiation-absorption member configured to absorb an incident radiation, to undergo heating from such absorption, and to exhibit a corresponding displacement from such heating. Desirably, the radiation-absorption member reflects a portion of the incident radiation. The detector also comprises a radiation-reflection member situated at a distance $n\lambda_0/4$ from the radiation-absorption member, wherein n is an odd integer and $\lambda_0$ is the median wavelength of a desired range of wavelengths of the incident radiation. The radiation-reflection member totally reflects the incident radiation. With this configuration, the incident radiation need not be infrared (IR) radiation, but alternatively can be any of various other types of electromagnetic radiation such as X-rays, ultraviolet rays, and the like.

The radiation detector can be configured as a light-readout-type radiation detector, for reading out a displacement caused in a displaceable structure as a change in readout light irradiated separately onto the detector. Alternatively, the radiation detector can be configured to read out displacements as corresponding changes in capacitance across respective electrodes. The latter configuration is termed a "capacitance-type" detector.

In the case of the light-readout-type radiation detector, a readout-light reflector member can be provided with the displaceable structure for measuring the displacement of the displaceable structure. For example, a semitransparent mirror can be provided on the displaceable structure to both reflect and transmit readout light. A readout-light reflector also can be provided on the substrate so as to face the semi-transparent mirror. The displaceable structure also includes an absorbing region to absorb incident radiation. A part of the incident radiation is absorbed by the absorbing region. Remaining incident radiation is reflected by an incident-radiation reflector back to the absorbing region. Thus, an interference is established between the absorbing region and the incident-radiation reflector as a result of the distance between these structures being defined as noted above. The amount of absorbed incident radiation by the absorbing region is maximized using such a structure. Even if the thickness of the absorbing region is reduced and thermal capacity decreased, the absorption efficiency of incident radiation is still increased, thereby increasing detection sensitivity and detection responsiveness.

In the case of a capacitor-type radiation detector, the movable electrode can be provided on the displaceable structure, and a fixed electrode can be provided on or in the substrate so as to face the movable electrode.

In any event, the efficiency of absorption of incident radiation is further increased if the reflectivity of the incident-radiation absorbing region is about 33% (i.e., about $\frac{1}{3}$), which is desirable.

Radiation is absorbed and thus heat is generated from the incident-radiation reflector based on the interference phenomenon summarized above. However, the volume of radiation absorbed by the radiation absorber is greater than the amount of radiation absorbed by the radiation reflector. Thus, since the displaceable structure includes the incident-radiation absorber (in contrast to placing the radiation absorber on the substrate and the radiation reflector on the displaceable structure), a large displacement of the displaceable structure is achieved with the same amount of incident radiation, thereby increasing detection sensitivity.

Whenever the radiation absorber is affixed to the substrate via a thermal-insulation member not provided to the displaceable structure, and heat generated in the radiation absorber is conducted to the displaceable structure, heat generated in the radiation absorber passes to the substrate through the thermal-insulator because it is impossible to insulate heat perfectly. Thus, detection sensitivity could be reduced since heat is not being effectively conducted to the displaceable structure. But, by placing the radiation absorber on the displaceable structure, heat generated in the radiation absorber is effectively conducted to the displaceable structure, thereby enhancing detection sensitivity.

The radiation reflector may be provided on the displaceable structure in order for a relative-positional relationship between the radiation reflector and the radiation absorber to be maintained substantially constant, notwithstanding any displacement of the displaceable structure.

It is not required that the radiation reflector be provided on the displaceable structure. It is possible to obtain a stable spectral response characteristic even if the radiation reflector is provided on the displaceable structure (in order for the relative relationship between the radiation reflector and the radiation absorber to be kept in a constant condition), notwithstanding displacement of the displaceable structure. Namely, since the relative relationship between the radiation reflector and the radiation absorber is kept in a constant condition notwithstanding displacement of the displaceable structure, absorption of radiation by the radiation absorber occurs in accordance with the above-described interference principle. Hence, it is possible to keep the wavelength range of radiation absorbed in the radiation absorber in a constant condition.

A readout-light reflector reflecting received readout light may be included on the displaceable structure. The readout-light reflector can serve both as an incident-radiation reflector and a readout-light reflector or can be formed as a readout-light reflector only.

For a readout-light-type radiation detector, it is possible to provide a simple structure inexpensively by forming the radiation reflector to serve both as an incident-radiation reflector and a readout-light reflector.

A fixed electrode may be provided in the substrate and a movable electrode may be provided in the displaceable structure so as to face the fixed electrode. Thus, the radiation reflector may serve both as an incident-radiation reflector and as a movable electrode, or can be formed in the movable electrode.

For a capacitor-type radiation detector, it is possible to provide a simple structure inexpensively by forming the radiation reflector to serve both as the incident-radiation reflector and as the movable electrode.

A fixed electrode can be provided in the substrate and a movable electrode can be provided in the displaceable structure so as to face the fixed electrode. Thus, the radiation reflector can serve both as an incident-radiation reflector and a fixed electrode.

The fixed electrode can be provided in the substrate and a movable electrode can be provided in the displaceable structure so as to face the fixed electrode. Thus, the radiation reflector can serve as both an incident-radiation reflector and as a movable electrode.

When at least one of the radiation absorber and the radiation reflector is provided in the displaceable structure by a membrane member having a planar portion composed of one or more membrane layers and supported such that the planar portion is suspended in the air, it is preferable to form a rising portion extending from the planar portion, or a dropping portion extending from the planar portion around at least a portion of the periphery of the planar portion. In another configuration, when at least one radiation absorber and a radiation reflector is provided in the displaceable structure formed by a membrane member having a planar portion composed of plural layered membranes and supported in such a way that the planar portion is suspended in the air, it is preferable to form one or more layered membranes of the plural layered membranes so as to cover a different one or more layered membranes of the plural layered membranes around at least part of the periphery of the planar portion. In such cases, the planar surface of one or both of the radiation reflector and the radiation absorber provided in the displaceable structure is reinforced by the rising portion, the dropping portion, or the portion in which one or more layered membranes cover an edge portion of different one or more layered membranes. In such a configuration, the membrane thickness of the planar portion can be reduced without compromising strength. Thus, it is possible to decrease the thermal capacity while preventing deformation caused by excessive structural weakness. As a result, the detection response is enhanced while providing a more stable spectral response characteristic. This is achieved in part by maintaining constancy of the distance between the radiation absorber and the radiation reflector that would otherwise arise due to such deformation.

The foregoing and other features and advantages of the invention will be more readily apparent from the following detailed description, which proceeds with reference to the accompanying drawings.

BRIEF DESCRIPTION OF THE DRAWINGS

FIG. 1(b) is an elevational section along the line X1–X2 of FIG. 1(a).

FIGS. 5(a)–5(l) are respective schematic elevational sections of various possible layer and edge configurations of the reflector used in a detector according to the invention.

FIG. 8 is a schematic elevational section along the line X13–X14 of FIG. 6.

FIG. 9 is a schematic elevational section along the line X15–X16 of FIG. 6.

FIG. 10 is a schematic elevational section along the line Y11–Y12 of FIG. 6.

FIG. 37 is a schematic elevational section of a pixel of a light-readout-type radiation detector according to Representative Embodiment 8.

FIG. 39 is a schematic elevational section of a pixel of capacitor-type radiation detector according to Representative Embodiment 10.

DETAILED DESCRIPTION

The invention is described below in the context of multiple representative embodiments. However, it will be understood that the embodiments are not to be regarded as limiting in any way.

Although the following description sets forth embodiments in which incident radiation (i.e., radiation to be sensed) is infrared (IR) light and readout (signal) light is visible light, it will be understood that incident radiation alternatively can be any of various types of electromagnetic radiation other than IR light, such as X-rays or ultraviolet light. It also will be understood that the readout light can be other than visible light.

Representative Embodiment 1

Figure 1A:
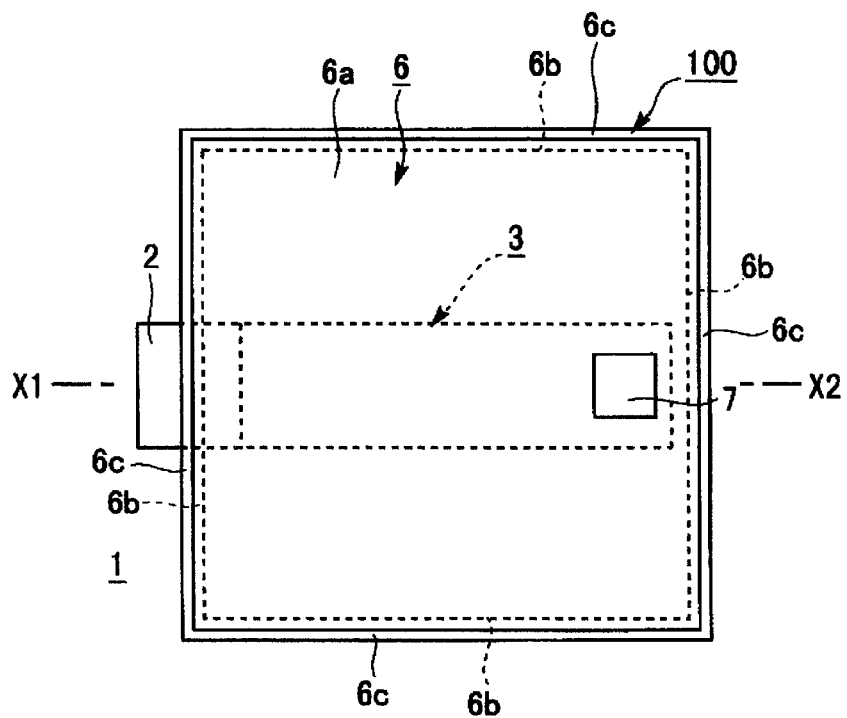
FIGS. 1(a)–(b) are schematic plan and sectional views, respectively, of a pixel of a radiation detector according to Representative Embodiment 1.
Figure 1B:
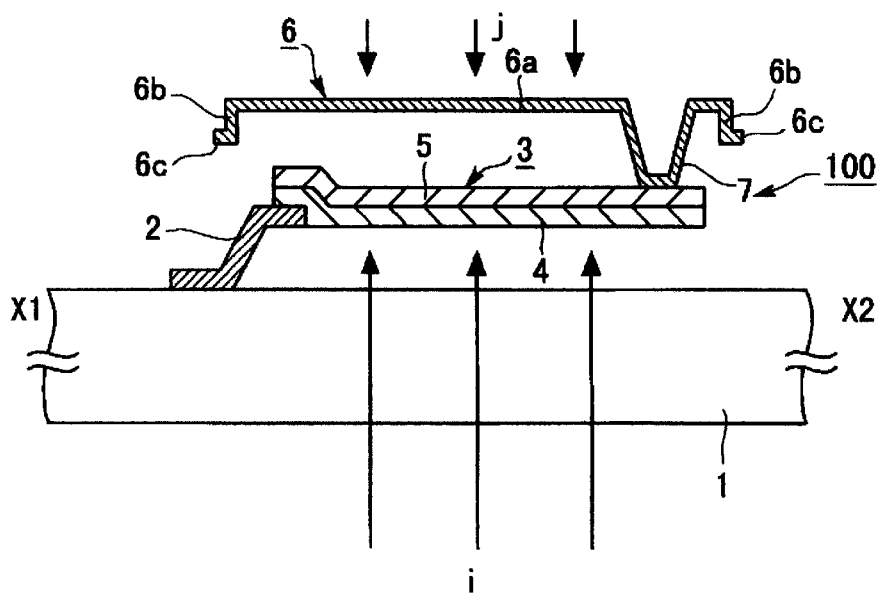

A single unit element ("pixel") of a radiation detector 100 according to this embodiment is shown in FIGS. 1(a)–1(b). FIG. 1(a) is a schematic plan view, and FIG. 1(b) is a schematic elevational section along the line X1–X2 of FIG. 1(a).

The radiation detector 100 includes a substrate 1 such as a silicon substrate that is transmissive to IR light "i". The substrate 1 serves as a base body for the detector 100. The detector 100 also includes a displaceable member 3 that, whenever the displaceable member 3 absorbs heat, exhibits a displacement relative to the substrate 1. The displaceable member 3 is mounted to a leg 2 attached to the substrate 1. The displaceable member 3 is configured as a cantilever, in which one end of the displaceable member 3 is supported by the leg 2 so as to be suspended a defined distance above the substrate 1. Attached to the displaceable member 3 is a reflector 6 configured to move with the displaceable member 3 and reflect incoming read-out (signal) light "j". Thus, as the displaceable member 3 experiences a displacement relative to the substrate 1, the corresponding change in the orientation of the reflector 6 causes a corresponding change in the signal light.

The displaceable member 3 includes first and second membranes 4, 5 that are formed of respective substances having different coefficients of thermal expansion. Thus, the membranes 4, 5 collectively form a thermal bimorph structure. As the displaceable member 3 is heated directly or indirectly by incident IR radiation i, the displaceable member 3 bends upward whenever the coefficient of thermal expansion of the first (lower) membrane 4 is larger than the coefficient of thermal expansion of the second (upper) membrane 5. The opposite displacement occurs whenever the coefficient of thermal expansion of the second (upper) membrane 5 is larger than the coefficient of thermal expansion of the first (lower) membrane 4.

The displaceable member 3 can include an IR-absorption region capable of absorbing incident IR rays i and being directly heated by such absorption. As the displaceable member 3 receives such radiation, the IR-absorption region is heated, which causes the displaceable member 3 to exhibit a corresponding displacement. However, it is not necessary that the displaceable member 3 actually be the IR-absorption region. I.e., it is not necessary that the displaceable member 3 serve both as a displaceable member and an IR absorber. It is possible, for example, to situate an IR absorber (e.g., gold black) beneath the first membrane 4.

The reflector 6 is situated a defined distance above the displaceable member 3. As shown in FIG. 1(a), the reflector 6 as attached to the displaceable member 3 is configured to cover substantially the entire respective pixel. The reflector 6 includes a planar portion 6a suspended above the displaceable member 3. The reflector 6 is formed of a layer of which the planar portion 6a serves to reflect readout (signal) light j. Desirably around the periphery of the planar portion 6a is a "dropping portion" 6b directed downward relative to the planar portion 6a. The dropping portion 6b desirably is edged with a horizontal lip portion 6c protruding outward slightly from the bottom of the dropping portion 6b.

The dropping portion 6b and lip portion 6c desirably extend completely around the periphery of the planar portion 6a so as to provide the planar portion 6a with maximal strength. However, the lip portion 6c is not required, and the dropping portion 6b need not extend completely around the periphery of the planar portion 6a, so long as the reflector 6 has sufficient strength.

The reflector 6 is attached to the displaceable member 3 via a connecting post 7. The planar portion 6a, the dropping portion 6b, lip portion 6c, and connecting post 7 desirably are formed integrally from a single layer such as an aluminum layer. Alternatively, the connecting post 7 may be formed of a material having a lower thermal conductivity than the planar portion 6a, dropping portion 6b, and lip portion 6c. With the alternative configuration, although an insignificant amount of readout light j is absorbed by the reflector 6, the temperature of the reflector 6 is increased by absorption of any readout light. If the connecting post 7 is made of a material having a lower thermal conductivity than the reflector 6, then the connecting post 7 can function to thermally isolate the reflector 6 from the displaceable member 3. Such a configuration can provide an improved signal-to-noise (S/N) ratio.

Hence, each pixel of a radiation detector 100 according to this embodiment comprises a displaceable member 3, a leg 2, and a reflector 6. The pixels desirably are arranged on the substrate 1 in a one-dimensional or two-dimensional array. Also, in this embodiment, the substrate 1, the displaceable member 3, and the leg 2 form a thermal-based radiation detector in which the displaceable member 3 of each pixel is displaced independently due to heating.

A representative method for manufacturing the radiation detector 100 is depicted in FIGS. 2(a)–2(d), which show (in schematic vertical sections) the results of certain respective steps of the method. The sections correspond to the section shown in FIG. 1(b).

Figure 2A:
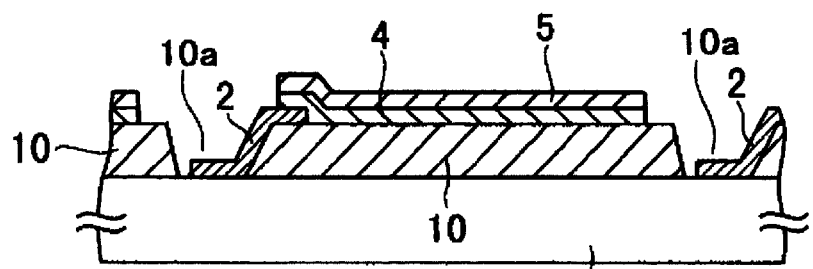
FIGS. 2(a)–(d) show, in respective schematic vertical sections, the results of respective steps in a method for fabricating the radiation detector of Representative Embodiment 1.

In a first step, as shown in FIG. 2(a), a resist 10 is deposited on the entire surface of the silicon (Si) substrate 1. The resist 10 is patterned by microlithography to have openings 10a, each corresponding to a respective leg 2 of a respective pixel. Next, a silicon dioxide layer is formed by plasma-enhanced chemical vapor deposition (P-CVD). The silicon dioxide layer is patterned by photo-etching to form the legs 2. Next, a silicon nitride layer (having a thickness of 2500 Å, for example) is formed (by P-CVD). The silicon nitride layer is destined to become the lower layer 4 of the displaceable member 3. The silicon nitride layer is appropriately patterned (to define the layer 4) by photo-etching, thereby forming the lower layer 4 in each pixel. A layer (having a thickness of 1500 Å, for example) of aluminum is then deposited (by, e.g., evaporative sputtering) which is destined to become the upper membrane 5 of the displaceable member 3. The aluminum layer is patterned by photo-etching to complete formation of the upper layer 5 (FIG. 2(*a*)).

Next, a layer of resist 11 is applied (as a sacrificial layer) to the entire surface of the structure shown in FIG. 2(*a*). Openings 11*a* (corresponding to the respective locations of the connecting posts 7) are formed in the resist 11 by microlithography (FIG. 2(*b*)).

A polyimide layer 12 (as a sacrificial layer) is then deposited on the entire surface of the structure shown in FIG. 2(*b*) by spin coating. Trenches 12*a* (corresponding to the respective locations of the lip portions 6*c* and dropping portions 6*b* of the reflecting member 6), and openings 12*b* (corresponding to the respective locations of the connecting posts 7) are formed in the polyimide layer 12 by photo-etching (FIG. 2(*c*)).

Next, a layer of aluminum (having a thickness of 2000 Å, for example) is deposited (by a suitable evaporative process) on the entire surface of the structure shown in FIG. 2(*c*). The aluminum layer is destined to become the connecting posts 7 of the respective reflectors 6. Representative exaporative methods for applying the aluminum layer include resistance-heating evaporation, electron-beam evaporation, sputtering, molecular beam epitaxy, etc.) The aluminum layer is patterned by photo-etching to form the reflectors 6 (FIG. 2(*d*)). The dropping portions 6*b* and lip portions 6*c* are formed by aluminum deposition in the openings 12*a* in the polyimide layer 12; these depositions are also patterned when the aluminum layer is patterned. Formation of the lip portions 6*c* can be prevented by suitably changing the patterning of the aluminum membrane.

As an alternative to aluminum, the reflectors 6 and connecting posts 7 can be made of Cu, Au, Pt, Pd, Ti, Ta, Cr, Sn, W, or Mo.

Finally, the structure shown in FIG. 2(*d*) is cut ("diced") into individual chips (each comprising an array of multiple pixels). The resists 10, 11 and the polyimide layer 12 are removed by ashing. The resulting structure is as shown in FIG. 1(*b*).

In this embodiment, since the reflector 6 (serving as a displaceable read-out member) is situated above and displaced from the displaceable member 3, the displaceable member 3 and the reflector 6 are effectively stacked vertically, allowing the entire area occupied by these structures in each pixel to be reduced. This allows a corresponding increase in the pixel density of the detector 100.

Also, in this embodiment, since the dropping portion 6*b* is formed around the periphery of the planar portion 6*a* of the reflector 6, the planar portion 6*a* is structurally reinforced by the dropping portion 6*b*. This configuration not only provides the planar portion 6*a* with a desired mechanical strength, but also allows the thickness of the planar portion 6*a* to be reduced.

Figure 3A:
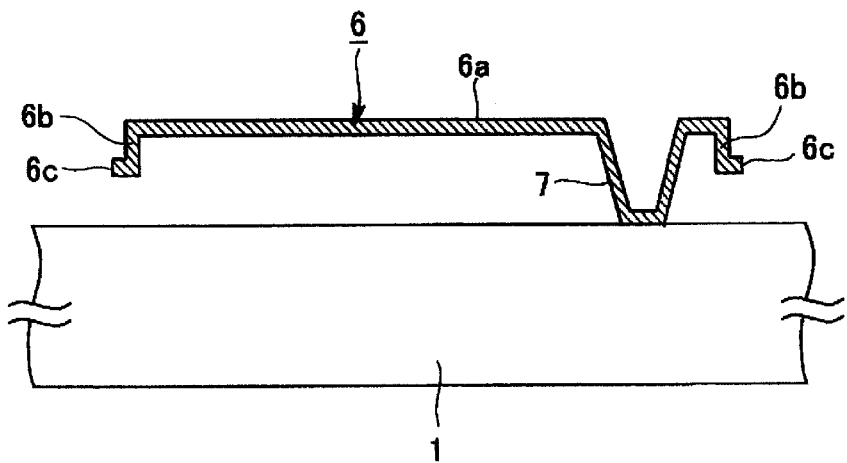
FIGS. 3(a)–3(b) schematically illustrate, in respective elevational sections, the results of an experiment showing the decrease in thickness of the reflector 6 that can be achieved according to the invention.
Figure 3B:
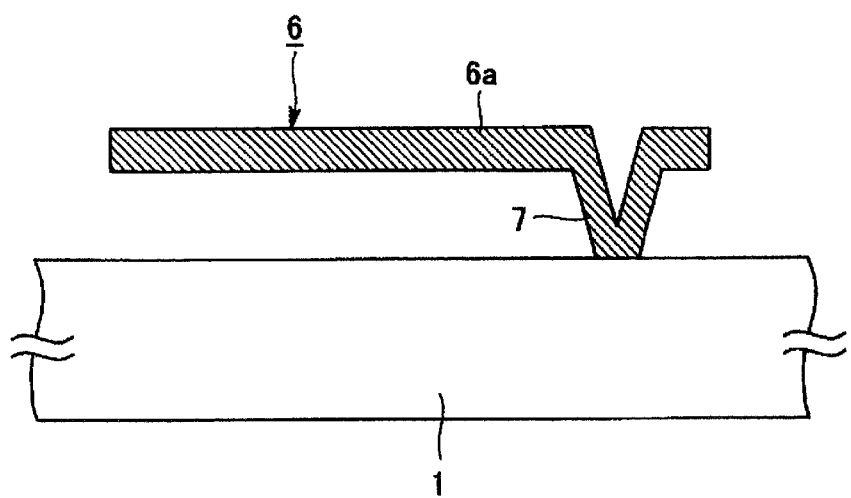

In this regard, the results of certain experiments performed by applicants are shown in FIGS. 3(*a*)–3(*b*). In FIGS. 3(*a*)–3(*b*), the same reference numerals are used as in FIGS. 1(*a*)–1(*b*). In the specimen shown in FIG. 3(*a*) the reflector 6 is connected directly to the substrate 1 via the connecting post 7, and the dropping portion 6*b* and lip portion 6*c* extend fully around the periphery of the planar portion 6*a*. In the specimen shown in FIG. 3(*b*), the reflector 6 is connected directly to the substrate 1 via the connecting post 7, but the lip portion 6*c* and dropping portion 6*b* are absent. I.e., the reflector 6 of the FIG. 3(*b*) specimen includes only of the planar portion 6*a*. In the specimens of FIGS. 3(*a*)–3(*b*), the reflector 6 and connecting post 7 are formed of a single layer of aluminum. The reflector 6 in each specimen has an area of 50 μm×50 μm.

In the FIG. 3(*a*) specimen, if the thickness of the reflector 6 were 2000 Å (or more), then a planar aspect of the planar portion 6*a* could be maintained without the planar portion 6*a* bending under its own weight. On the other hand, in the FIG. 3(*b*) specimen, if the thickness of the reflector 6 were 2000 Å, then a planar aspect of the planar portion 6*a* could not be maintained because the planar portion 6*a* would bend under its own weight. To prevent such bending, the reflector 6 of the FIG. 3(*b*) specimen must be increased to at least 8000 Å.

Hence, according to this embodiment, the thickness of the planar portion 6*a* is reduced substantially while maintaining a desired mechanical strength of the reflector 6. The reduction of thickness achieves a corresponding decrease in mass of the reflector 6, thereby allowing the mechanical strength of the displaceable member 3 supporting the reflector 6 to be reduced, and the respective thicknesses of the layers 4, 5 comprising the displaceable member 3 to be reduced.

The magnitude (y) of displacement of a displaceable member 3 is quantitatively expressed by Equation (1), below, for a situation in which the respective thicknesses of the layers 4, 5 are equal (this equal-thickness condition is not required in this embodiment). In Equation (1), "l" is the length of the displaceable member 3, "h" is the total thickness of the layers 4, 5 comprising the displaceable member 3, "k" is a bending coefficient corresponding to the materials from which the layers 4, 5 are made, and "T" is the temperature increase in the displaceable member 3.

$$y = (KTl^2)/h \quad (1)$$

As indicated in Equation (1), the thinner the thickness h of the displaceable member 3, the larger the magnitude y of displacement of the displaceable member 3 per incremental change in temperature T. Thus, by reducing its thickness, the sensitivity of the displaceable member 3 is correspondingly increased. Since the thickness of the layers 4, 5 can be reduced in this embodiment as explained above, the sensitivity of the displaceable member 3 is increased, thereby providing a radiation detector with greater sensitivity to incident IR radiation than conventional detectors.

An example of an imaging apparatus with which the radiation detector 100 can be used is described below with reference to FIG. 4. The FIG. 4 apparatus includes a readout-optical system (described below), a two-dimensional charged-coupled device (CCD) 20 for imaging, and an image-formation lens 22 that causes IR rays to form an IR-ray image of a thermal source 21. Imaging occurs on the surface of the detector 100 comprising multiple pixels. In each pixel, a displaceable member 3 absorbs a respective portion of the incident IR rays. The IR rays are produced by the thermal source 21 and are refracted by a lens 22 onto the detector 100.

The readout-optical system includes a laser diode 23, a first lens system 24, a "light-beam regulator" (e.g., aperture) 25, and a second lens system 26. The laser diode 23 serves as a supply of readout light. The first lens system 24 is situated and configured to guide the readout light from the laser diode 23 to the respective reflectors 6 of the pixels of the radiation detector 100. The light-beam regulator 25 is situated and configured to selectively pass only a desired portion of the signal light reflecting from the respective reflectors 6 of the pixels after the signal light from the reflectors 6 passes through the first lens system 24. The second lens system 26 is situated and configured to guide signal light from the light-beam regulator 25 to the CCD 20. The second lens system 26 defines a "cooperating position" situated relative to the reflectors 6, and cooperates with the light-beam regulator 25 to guide signal light passing through the light-beam regulator 25 to the cooperating position.

The laser diode 23 is arranged off-axis on one side (right-hand side in FIG. 4) of the optical axis O of the first lens system 24. Readout light from the laser diode 23 passes off-axis through the first lens system 24. The laser diode 23 desirably is situated close to the focal points of the second lens system 26 and the first lens system 24. Readout light that has passed through the first lens system 24 is roughly collimated to irradiate all the pixels (and thus all the reflectors 6). To enhance the contrast of an optical image as formed on the CCD 20, a readout-light aperture (not shown) may be provided in front of the laser diode 23. The radiation detector 100 desirably is arranged such that the surface (parallel with the collective surfaces of the reflectors 6 when not irradiated) of the substrate 1 is perpendicular to the axis O. However, this embodiment is not limited to such a configuration.

The light-beam regulator 25 desirably comprises a plate defining an aperture 25a that is situated off-axis (left-hand side in FIG. 4) relative to the optical axis O of the first lens system 24. The light-beam regulator 25 desirably is situated on a focal plane of the first lens 24. Thus, the aperture 25a is situated at a point at which rays (a bundle of independent signal-light rays reflected by respective reflectors 6) are condensed by the first lens system 24 whenever infrared rays are not being absorbed by the displaceable members 3 of the detector 100 (i.e., whenever all the reflectors 6 are arranged parallel with the surface of the substrate 1). The size of the opening 25a desirably is nearly equal to the point at which the signal-light rays are condensed by the first lens system 24. However, the size of the opening 25a can be defined freely without being limited to such an arrangement and/or size.

Figure 4:
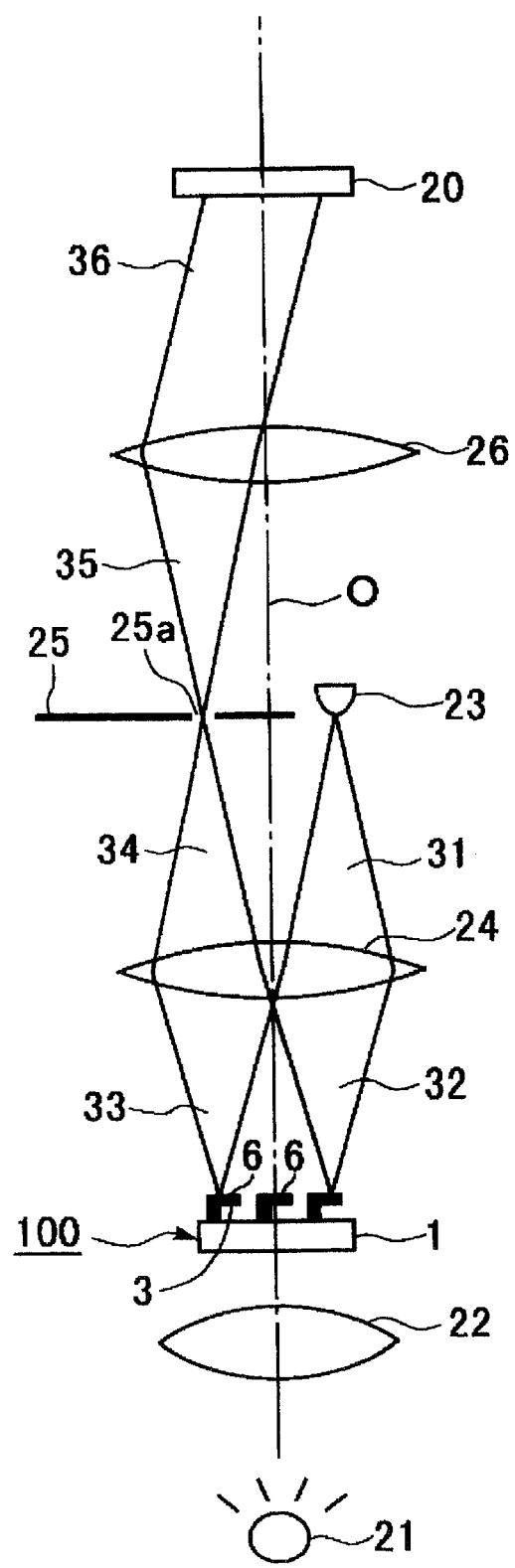
FIG. 4 is a schematic elevational view of an imaging apparatus with which various embodiments of radiation detectors according to the invention can be used.

In accordance with the imaging apparatus shown in FIG. 4, rays 31 of readout light irradiated from the laser diode 23 propagate to the first lens system 24 and are collimated by passage through the first lens system 24 to produce parallel rays 32. The parallel rays 32 propagate to the respective reflectors 6 of the pixels of the radiation detector 100 at a predetermined angle to the axis O.

IR light from the thermal source 21 is condensed by passage through the image-formation lens 22. Thus, respective portions of an IR image of the thermal source 21 are formed on the "surface" collectively defined by the displaceable members 3 of the radiation detector 100. The incident IR rays are absorbed by the respective displaceable members 3 and converted to heat. In accordance with the respective heating, each respective displaceable member 3 inclines toward the substrate 1. As a result, the respective reflector 6 of each pixel inclines by an amount that corresponds to the quantity of IR radiation incident to the respective displaceable member 3.

At this stage, assume that the IR rays are not irradiated to the displaceable members 3 of all the pixels. The reflector 6 of each of such pixels is parallel with the substrate 1. Signal light 32 directed to the reflectors 6 is reflected by the reflectors 6 to form reflected signal light 33 that propagates to the first lens system 24. Upon passage through the first lens 24, the signal light 33 (now condensed light 34) converges on the opening 25a of the light-beam regulator 25. Signal light 35 passing through the opening 25a divergently propagates to the second lens system 26. The second lens system 26 collimates signal light 36 passing therethrough. The signal light 36 propagates to a light-sensing surface of the two-dimensional CCD 20. Since the reflector 6 of each pixel and the light-sensing surface of the CCD 20 function cooperatively due to the action of the lens systems 24, 26, an image portion contributed by each reflector 6 is formed on a corresponding locus of the light-receiving surface of the CCD 20. Differential amounts of light received by each locus on the CCD 20 define the image, sensed by the CCD 20, of the thermal source 21.

Now assume that certain of the displaceable members 3 of the pixels are irradiated with respective amounts of IR light from the thermal source 21. In such pixels, the respective reflectors 6 are tilted toward the surface of the substrate 1. The degree of tilt is a function of the amount of IR light absorbed by (and thus heat conducted to) the respective displaceable member 3. A ray of signal light (in the signal-light flux 32) directed to a particular tilting reflector 6 is reflected by the reflector 6 in a direction that is directly related to the particular tilt of the reflector 6. The reflected signal light 33 from the reflector 6 is condensed by the first lens system 24 at a location that is displaced from the opening 25a. The amount of displacement is related to the particular tilt of the reflector 6. As a result, the light-beam regulator 25 blocks some of the signal light reflected from the tilted reflector 6. The greater the tilt of the reflector 6, the greater the amount of signal light 34 blocked by the light-beam regulator 25.

Thus, signal light from all the pixels of the radiation detector 100 passes through the second lens system 26 and impinges as an optical image on respective locations of the light-receiving surface of the CCD 20. The optical image is picked up by the CCD 20. Alternatively, for example, the optical image may be observed by an unaided eye.

It will be understood that the structure of the readout-optical system is not limited to the specific structure shown in FIG. 4. Furthermore, although the FIG. 4 embodiment was described in connection with forming a two-dimensional image, the radiation detector 100 can comprise as few as only one pixel. A one-pixel radiation detector 100 can be used with a light detector 20 having only a single point sensor rather than a two-dimensional CCD. Alternatively, the detector 100 can comprise multiple pixels arranged in a one- or two-dimensional array. Similar modifications of the readout optical system can be employed in any of the other representative embodiments described below.

FIGS. 5(a)–5(l) provide respective schematic elevational sections of various possible layer and edge configurations of the reflector in a detector according to the invention. The respective reflector shown in each of FIGS. 5(a)–5(l) includes a suspended planar portion 41a (corresponding to the planar portion 6a of the FIG. 1(a) embodiment). The left-hand portion in each figure (representing a left edge of the respective planar portion 41a) represents a portion of the peripheral edge of the respective planar portion 41a.

In the configuration shown in FIG. 5(a), a rising portion 41d (extending upward from the planar portion 41a) is formed around all or a portion of the periphery of the planar portion 41a. A horizontal lip portion 41c extends outwardly from the rising portion 41d. The planar portion 41a, the rising portion 41d, and the horizontal lip 41c are integrally formed as a single layer 45.

In the configuration shown in FIG. 5(b), a dropping portion 41b (extending downward from the planar portion 41a) is formed around all or a portion of the periphery of the planar portion 41a. No lip portion is present. The planar portion 41a and dropping portion 41b are integrally formed as a single layer 45.

In the configuration shown in FIG. 5(c), a dropping portion 41b (extending downwardly from the planar portion 41a) is formed around all or a portion of the periphery of the planar portion 41a. A horizontal lip portion 41c extends outwardly from the dropping portion 41b. The planar portion 41a is composed of two layers 45, 46, and the dropping portion 41b and the lip portion 41c are formed by direct extension of the lower layer 46.

In the configuration shown in FIG. 5(d), a dropping portion 41b (extending downwardly from the planar portion 41a) is formed around all or a portion of the periphery of the planar portion 41a. A horizontal lip portion 41c extends outwardly from the dropping portion 41b. The planar portion 41a is composed of two layers 45, 46, and the dropping portion 41b and lip portion 41c are formed by direct extension of both layers 45, 46.

In the configuration shown in FIG. 5(e), a dropping portion 41b (extending downwardly from the planar portion 41a) is formed around all or a portion of the periphery of the planar portion 41a. No lip portion is present. The planar portion 41a is composed of two layers 45, 46, and the dropping portion 41b is formed by direct extension of the layers 45, 46.

In the configuration shown in FIGS. 5(a)–5(e), the rising portion 41d or dropping portion 41b formed along at least a segment of the periphery of the planar portion 41a reinforces the planar portion 41a. As a result, the thickness of the layer(s) forming the planar portion 41a can be reduced without compromising the mechanical strength of the planar portion 41a.

The configurations shown in FIGS. 5(c)–5(e) each have multiple layers 45, 46. Even if the respective thermal expansion coefficients of the layers 45, 46 are not identical, displacement of the planar portion 41a (in the absence of IR irradiation) is arrested by the presence of the respective dropping portion 41b and/or rising portion 41d, which maintains the structural rigidity of the planar portion 41a.

The reflector 6 of the FIG. 1 embodiment and the reflectors shown in FIGS. 5(a)–5(e) are respective examples of reflectors in which a respective dropping portion 41b and/or rising portion 41d extends at least part way around the periphery of the respective planar portion 41a. In contrast, the reflectors shown in FIGS. 5(f)–5(l) are respective examples of reflectors comprising multiple layers but edge reinforcement is provided without a rising portion or dropping portion.

In the configuration shown in FIG. 5(f), the planar portion 41a is composed of two layers 45, 46. The upper layer 45 covers the edges (i.e., the surface in the thickness direction) of the lower layer 46 at least along a segment of the periphery of the planar portion 41a. I.e., the upper layer 45 extends slightly downward over the edge of the lower layer 46 and then extends slightly outward.

The configuration shown in FIG. 5(g) differs from the FIG. 5(f) configuration in that the layer 45 in the FIG. 5(f) configuration only extends downward over the edge of the lower layer 46 without extending outward.

In the configuration shown in FIG. 5(h), the planar surface 41a is composed of three layers 45, 46, 47. The upper layer 45 covers the edges (i.e., the surfaces in the thickness direction) of the middle layer 46 and lower layer 47 at least along a segment of the periphery of the planar portion 41a. The upper layer 45 then extends slightly outward.

The configuration shown in FIG. 5(i) differs from the FIG. 5(f) configuration in that, in the FIG. 5(i) configuration, an additional layer 47 is situated atop the layer 45.

The configuration shown in FIG. 5(j) differs from the FIG. 5(f) configuration in that, in the FIG. 5(j) configuration, an additional layer 47 is situated beneath the layer 46. The layer 47 also extends to the edge of the lip portion of the layer 45 in the FIG. 5(j) configuration.

The configuration shown in FIG. 5(k) differs from the FIG. 5(g) configuration in that, in the FIG. 5(k) configuration, an additional layer 47 is situated above the layer 45 and also covers the portion of the layer 45 that covers the edge of the layer 46.

The configuration shown in FIG. 5(l) differs from the FIG. 5(f) configuration in that, in the FIG. 5(l) configuration, an additional layer 47 is situated above the layer 45 and covers the layer 45 completely out to the edge of the lip portion of the layer 45.

In the reflecting members shown in FIGS. 5(f)–5(l), since at least one layer is configured to cover at least a segment of a peripheral edge of at least one additional layer, the respective planar portions 41a are structurally reinforced. These configurations allow the thickness of the planar portion 41a to be reduced without compromising the mechanical strength of the planar portion 41a.

Further regarding the configurations of FIGS. 5(f)–5(l), even if the respective thermal expansion coefficients of the layers 45–47 are not identical, displacement of the planar portion 41a (in the absence of IR irradiation) is arrested by the presence of the respective portion of at least one layer covering a peripheral edge of at least one additional layer, which maintains structural integrity of the planar portion 41a.

It will be understood that the structures shown in FIGS. 5(a)–5(l) can be fabricated using semiconductor-fabrication technology involving layer formation, patterning, sacrificial-layer formation and removal, and so forth.

Any of the structures shown in FIGS. 5(a)–5(l) can be used as a reflector in place of the reflector 6 of FIG. 1(a). Also, any of the structures shown in FIGS. 5(a)–5(l) and/or the reflector 6 of FIG. 1(a) can be used in various types of devices including micro-machines and other micro-devices.

Representative Embodiment 2

Figure 6:
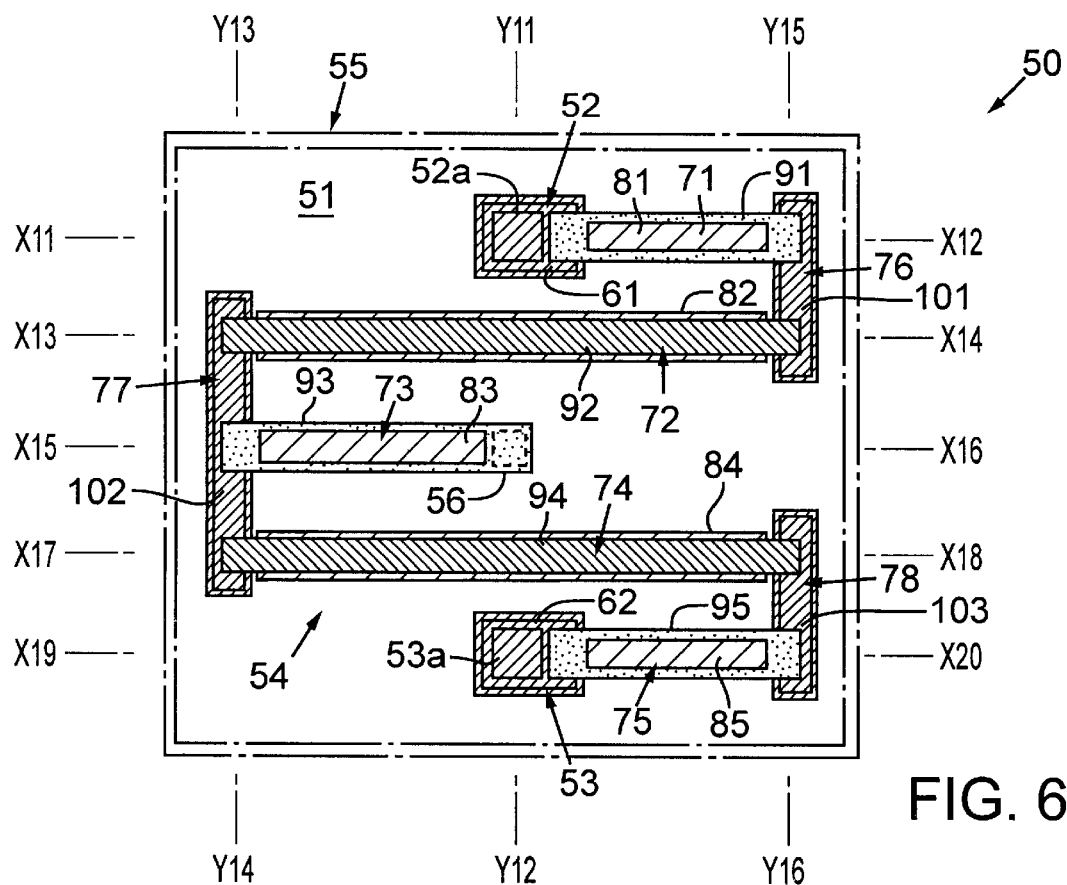
FIG. 6 is a schematic plan view of a pixel of a light-readout-type radiation detector according to Representative Embodiment 2.
Figure 7:
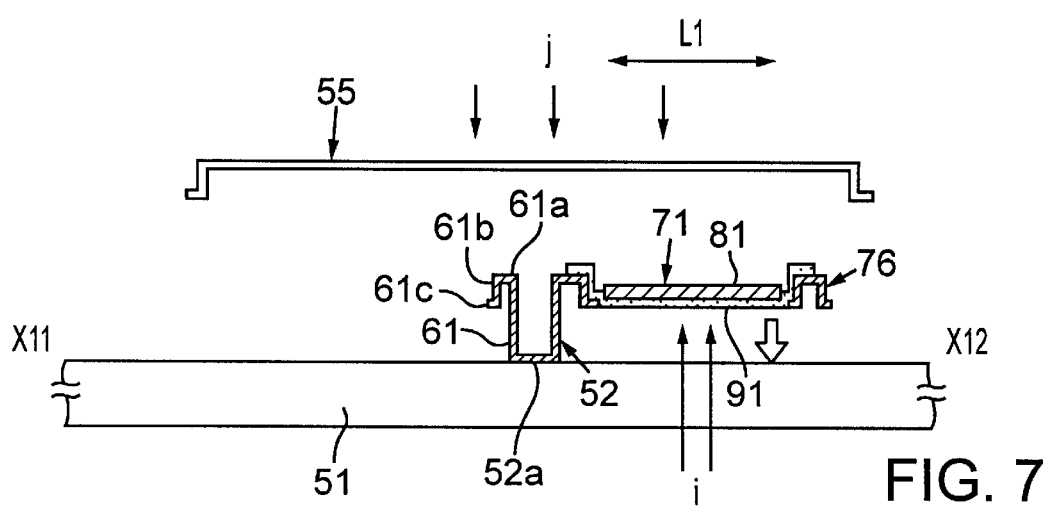
FIG. 7 is a schematic elevational section along the line X11–X12 in FIG. 6.
Figure 11:
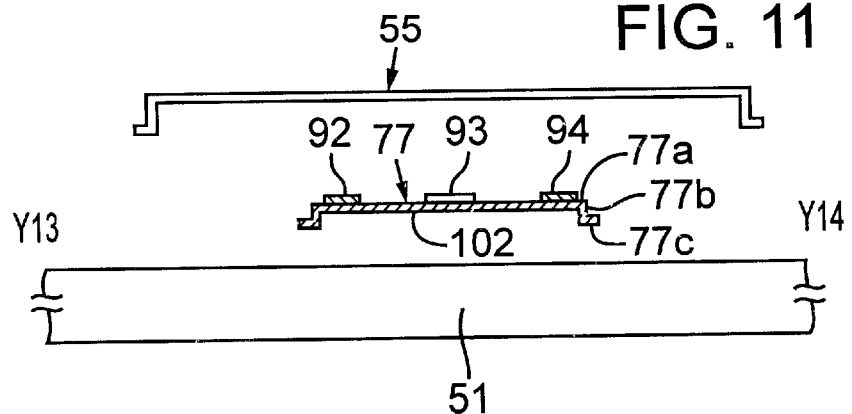
FIG. 11 is a schematic elevational section along the line Y13–Y14 of FIG. 6.
Figure 12:
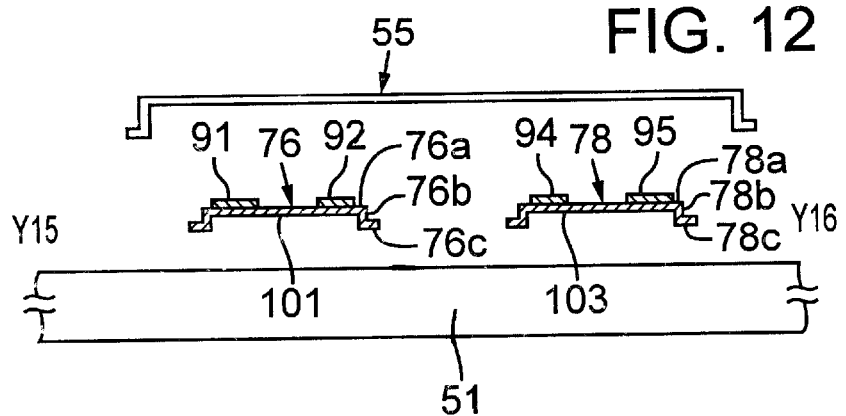
FIG. 12 is a schematic elevational section along the line Y15–Y16 of FIG. 6.

This embodiment is depicted in FIG. 6 showing a plan view of a single pixel (unit element) of a light-readout-type radiation detector 50. FIG. 7 is a schematic elevational section along the line X11–X12 of FIG. 6. FIG. 8 is a schematic elevational section along the line X13–X14 of FIG. 6. FIG. 9 is a schematic elevational section along the line X15–X16 of FIG. 6. FIG. 10 is a schematic elevational section along the line Y11–Y12 of FIG. 6. FIG. 11 is a schematic elevational section along the line Y13–Y14 of FIG. 6. FIG. 12 is a schematic elevational section along the line Y15–Y16 of FIG. 6. The schematic elevational section along the line X17–X18 of FIG. 6 is the same as shown in FIG. 8, and the schematic elevational section along the line X19–X20 of FIG. 6 is the same as shown in FIG. 7. In the following description, "right" and "left" are used as denoting right of FIG. 6 and left of FIG. 6, respectively.

A radiation detector 50 according to this embodiment comprises a silicon substrate 51, legs 52, 53, a displaceable structure 54, and a reflector 55. The two legs 52, 53 extend upward from the substrate 51 to support the displaceable structure 54 relative to the substrate 51 and allow displacement of the displaceable structure 54 relative to the substrate 51 whenever the displaceable structure absorbs heat. The reflector 55 reflects readout light j and is displaced along with any corresponding displacement of the displaceable structure 54.

The leg 52 includes portions 61 made of silicon nitride in a manner similar to that described for the reflector 6 of the FIG. 1 embodiment. Namely, the leg 52, as shown in FIG. 7, includes a horizontal portion 61a extending parallel to the surface of the substrate 51. The leg 52 also includes a dropping portion 61b extending from the horizontal portion 61a toward the surface of the substrate 51. The dropping portion 61b desirably extends downward from each edge of the horizontal portions 61a. The leg 52 also includes a lip portion 61c extending slightly outward laterally from the respective dropping portion 61b.

Similarly, the leg 53 includes portions 62 made of silicon nitride. The leg 53 includes a horizontal portion 62a extending parallel to the surface of the substrate 51, a dropping portion 62b, and a lip portion 62c as shown in FIG. 10.

In FIG. 6, the numerals 52a and 53a indicate contact points of the legs 52, 53, respectively, on the substrate 51. Also, the dropping portions 61b, 62b need not be formed on all sides of the respective horizontal portions 61a, 62a; the dropping portions 61b, 62b can be formed, for example, on only two sides extending to the right and left in FIG. 6.

The displaceable structure 54 in this embodiment comprises five independently displaceable members 71–75, respectively, and three connecting members 76–78, respectively, for mechanically connecting the members 76–78 together. The displaceable structure 54 "floats" over the substrate 51 at a distance from the substrate. This is achieved by affixing the left end of the independently displaceable member 71 via the leg 52 and the left end of the independently displaceable member 75 via the leg 53. The right end of the independently displaceable member 71 and the right end of the independently displaceable member 72 are connected together mechanically by the connecting member 76. The left end of the independently displaceable member 72, the left end of the independently displaceable member 73, and the left end of the independently displaceable member 74 are connected together mechanically by the connecting member 77. The right end of the independently displaceable member 74 and the right end of the independently displaceable member 75 are connected together mechanically by the connecting member 78.

Each of the independently displaceable members 71–75 extends in the right or left direction in a straight line, and is positioned parallel with each of the other displaceable members. Each of the independently displaceable members 71, 73, 75 is formed of an aluminum layer 81, 83, 85, respectively, with an underlying silicon dioxide layer 91, 93, 95, respectively, laminated thereto. Each of the independently displaceable members 72, 74 is formed of a silicon dioxide layer 92, 94, respectively, with an underlying aluminum layer 82, 84, respectively, laminated thereto. In FIGS. 6–12, the numerals 81–85 denote respective aluminum layers of the independently displaceable members 71–75, respectively, and the numerals 91–95 denote respective silicon dioxide layers of the independently displaceable members 71–75, respectively. The thermal expansion coefficient of aluminum is larger than the thermal expansion coefficient of silicon dioxide, and the relatively large/small relationship of the thermal expansion coefficients of the two layers forming each of the independently displaceable members 71, 73, 75 is in contrast to the relatively small/large relationship of the thermal expansion coefficients of the respective two layers forming each of the independently displaceable members 72, 74.

The connecting member 76 is formed of a layer 101 of silicon dioxide. The layer 101 has the same structure as the reflector 6 of the FIG. 1 embodiment. Namely, the connecting member 76 includes a horizontal portion 76a suspended from and parallel to the substrate 51 (FIG. 12). The connecting member 76 also includes a dropping portion 76b extending downward (toward the substrate 51) from the horizontal portion 76a and desirably extending from all sides of the horizontal portion 76a (FIG. 12). The connecting member 76 also includes a lip portion 76c extending laterally outward from the dropping portion 76b desirably around the entire periphery of the dropping portion 76b (FIG. 12). In the same manner, each of the connecting members 77, 78 is formed of a layer of silicon dioxide 102, 103, respectively, and includes a respective horizontal portion 77a, 78a, a dropping portion 77b, 78b, and a lip portion 77c, 78c (FIGS. 11, 12). The dropping portions need not extend around all edges of the respective horizontal portions of the connecting members 76–78. For example, the dropping portions can extend along only two opposing longitudinal edges.

The ends of the independently displaceable members 71–75 are affixed to respective legs 52, 53 or to respective connecting members 76–78 via extensions of the respective silicon dioxide layers 91–95. Thus, the independently displaceable members 71–75 extend from the horizontal portions of the respective legs 52, 53 and connecting members 76–78.

The independently displaceable members 71–75 serve both as respective structural members as well as respective IR-absorbing members for absorbing incident IR radiation. It is not necessary that both layers forming each of the independently displaceable members 71–75 serve both functions. It is possible, for example, to provide an IR-absorbing layer such as gold black beneath the lower of the two layers, thereby removing the IR-absorbing function.

As noted above, each end of the independently displaceable members 71–75 is affixed to the substrate 51 (via a respective leg) or to an end of an adjoining independently displaceable member via a respective connecting member 76–78, thereby connecting all five of the independently displaceable members 71–75 together. More specifically, one end of each independently displaceable member 71, 75 is connected to the substrate 51, but neither end of any of the independently displaceable members 72–74 is connected to the substrate 51.

If an independently displaceable member is an $N^{th}$ displaceable member in a sequence of such members (beginning from a displaceable member attached via a leg to the substrate 51, and wherein the number of independently displaceable members in the sequence is the smallest among various mechanically consecutive sequences from the substrate 51 to the independently displaceable member), then the above-noted independently displaceable member is termed the "$N^{th}$-stage" displaceable member. Accordingly, relative to an $(N+1)^{th}$-stage displaceable member, the $N^{th}$-stage displaceable member is termed the "preceding-stage" displaceable member. Similarly, relative to an $N^{th}$-stage displaceable member, the $(N+1)^{th}$-stage displaceable member is termed the "subsequent-stage" displaceable member. The $N^{th}$-stage displaceable member, wherein N is the number of members in the sequence, is termed the "final" displaceable member in the sequence.

According to the foregoing, the independently displaceable members 71–75 are the first, second, third, second, and first stages, respectively. Also, the independently displaceable member 73 is the "final" member in the sequence. Thus, the number of first-stage members 71, 75 is two, and the number of final-stage members is one. The structure of the first-stage displaceable member 71 relative to the final-stage member 73 is symmetrical with the structure of the first-stage displaceable member 75 relative to the final-stage member 73.

As noted above, an end of the preceding-stage displaceable member and the same end of the subsequent-stage displaceable member are connected together via a connecting member, as can be seen with each of the connecting members 76–78. For example, the right-hand end of the second-stage displaceable member 72 and the right-hand end of the first-stage displaceable member 71 are connected together via the connecting member 76. Thus, the independently displaceable members 71 and 72 are configured collectively as a folding structure with the fold being situated at the connecting member 76. According to the invention, the manner of connecting independently displaceable members together is not limited to such a folding manner. Any of various other connecting schemes alternatively may be used in which, for example, the right-hand end of a preceding-stage displaceable member and the left-hand end of a subsequent-stage displaceable member are mechanically connected together via a connecting member.

The reflector 55 includes a planar portion 55a that is suspended over, vertically displaced from, and parallel with the substrate 51, in the same manner as the reflector 6 of FIG. 1. The reflector 55 also includes a dropping portion 55b extending downward from a respective edge 55b of the planar portion 55a. A dropping portion 55b desirably is provided along each edge of the planar portion 55a (i.e., along the entire periphery 55b of the planar portion 55a), and a lip portion 55c desirably extends horizontally outward from the dropping portion 55b.

Respective reflectors 55 for the various pixels are located at regular intervals across the substrate 51. Each reflector 55 covers substantially the entire region occupied by the respective pixel. The center of each reflector 55 is affixed to an end of the final-stage independently displaceable member 73 of the displaceable structure 54 via a reflector-connecting post 56.

As shown in FIG. 9, the silicon dioxide layer 93 of the independently displaceable member 73 extends to the right past the right-hand end of the aluminum layer 83. The lower portion of the reflector-connecting post 56 is affixed to the extension 93a of the silicon oxide layer 93. The reflector-connecting post 56 actually is an extension of the aluminum layer forming the reflector 55. I.e., the reflector 55 (with connecting post 56) desirably is formed as a single contiguous layer of aluminum having a thickness of 2000 Å, for example.

In an alternative configuration, the aluminum layer 83 on the independently displaceable member 73 may serve, in addition to its structural role, as a reflector of incident readout light j. In performing the latter function, the aluminum layer 83 provides readout light that varies according to thermal displacement of the displaceable structure 54 without the need for the reflector 55. In this alternative configuration, a mask can be provided above the displaceable structure 54 to cause readout light j to be irradiated only on the aluminum layer 83.

Each set including a displaceable structure 54, legs 52, 53, and reflector 55 serves as a unit element (pixel) of the detector 50. The pixels can be arranged in a one- or two-dimensional array on the substrate 51 and can be as few as a single pixel per detector. Each displaceable structure 54, in combination with its respective legs 52, 53 and with the substrate 51, forms a separate thermal-type displacement element that exhibits displacement in response to heating. The magnitude of displacement is a function of the amount of heat absorbed by the thermal-type displacement element.

A representative method for fabricating a radiation detector 50 according to this embodiment is now described with reference to FIGS. 13–18. Each of FIGS. 13–18 is a schematic plan view illustrating the results of a respective step in the fabrication method. Each of these figures shows a region 200 corresponding to one pixel.

Figure 13:
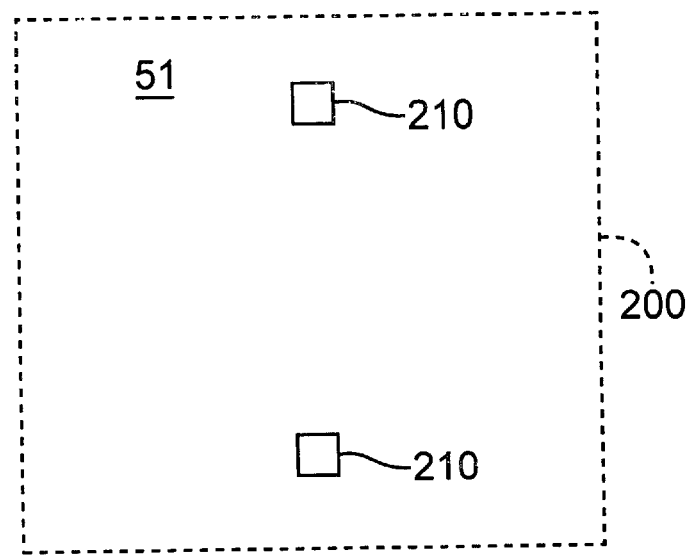
FIGS. 13–18 are schematic plan views each showing the result of a respective step in a method for fabricating a radiation detector according to Representative Embodiment 2.

First, a resist (not shown in the figure) is applied as a sacrificial layer over the entire surface of the silicon substrate 51, as shown in FIG. 13. Openings 210 in the resist are formed by microlithography. The openings 210 correspond to the locations at which contact pads 52a, 53a of the respective legs 52, 53 will be attached to the substrate.

Figure 14:
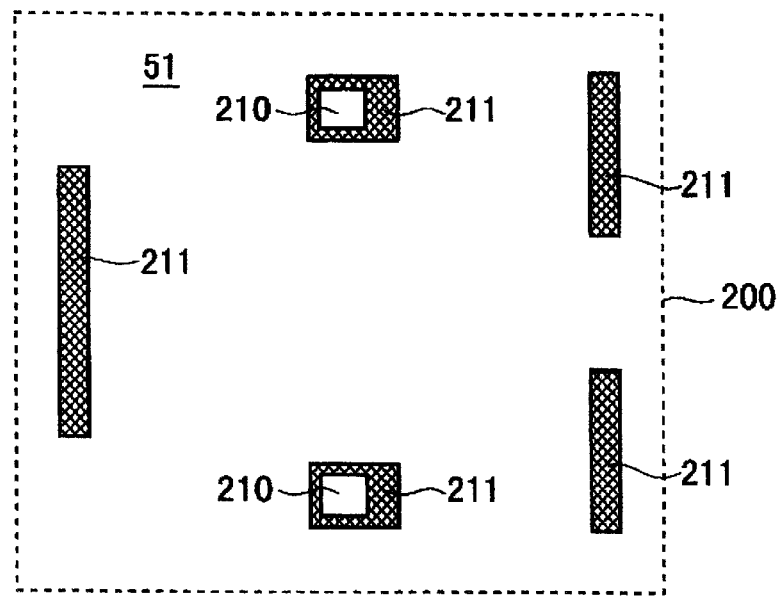

A polyimide layer 211 is deposited as a sacrificial layer on the entire surface of the substrate 51 by spin coating. Regions of the polyimide layer (including polyimide applied over the openings 210) are removed by photo-etching (FIG. 14). Thus, an island of polyimide is left surrounding each opening 210 and in locations on the substrate corresponding to respective connecting members 76–78.

Figure 15:
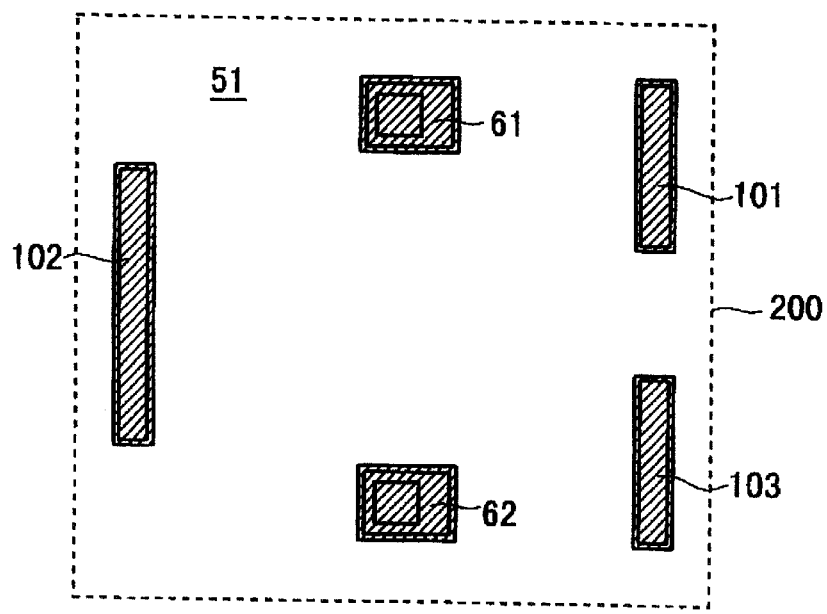

A silicon nitride layer (e.g., 3000 Å thick) is deposited by P-CVD and patterned by photo-etching. The remaining silicon nitride forms the silicon nitride portions 61, 62 of the legs 52, 53, respectively, and forms the silicon nitride layer 101–103 of each of the respective connecting members 76–78 (FIG. 15). At this stage, respective horizontal portions, dropping portions, and lip portions are formed because the regions of remaining silicon nitride are slightly larger than the respective underlying regions 211 of remaining polyimide.

Figure 16:
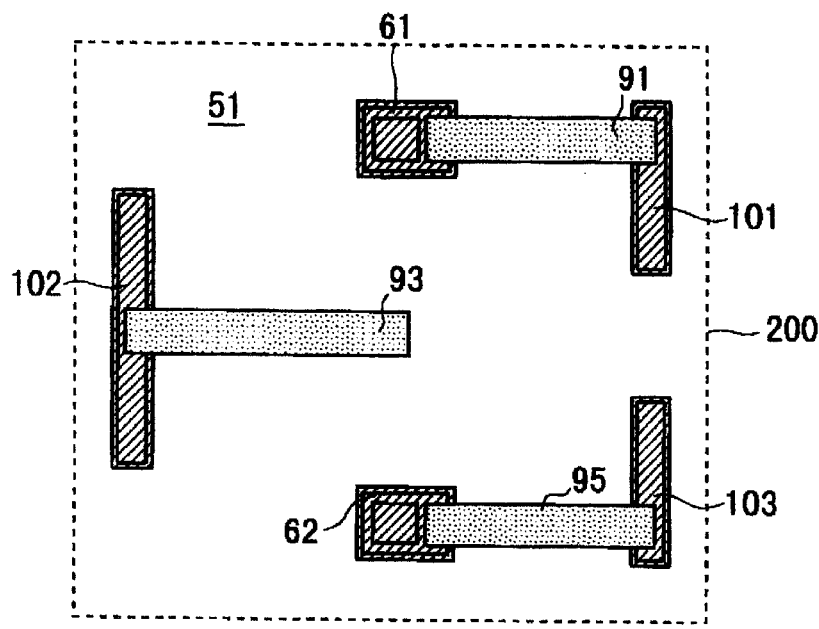

A silicon dioxide layer (2000 Å thick, for example) is applied by P-CVD and patterned by photo-etching to define the silicon dioxide layers 91, 93, 95 of the independently displaceable members 71, 73, 75, respectively (FIG. 16).

Figure 17:
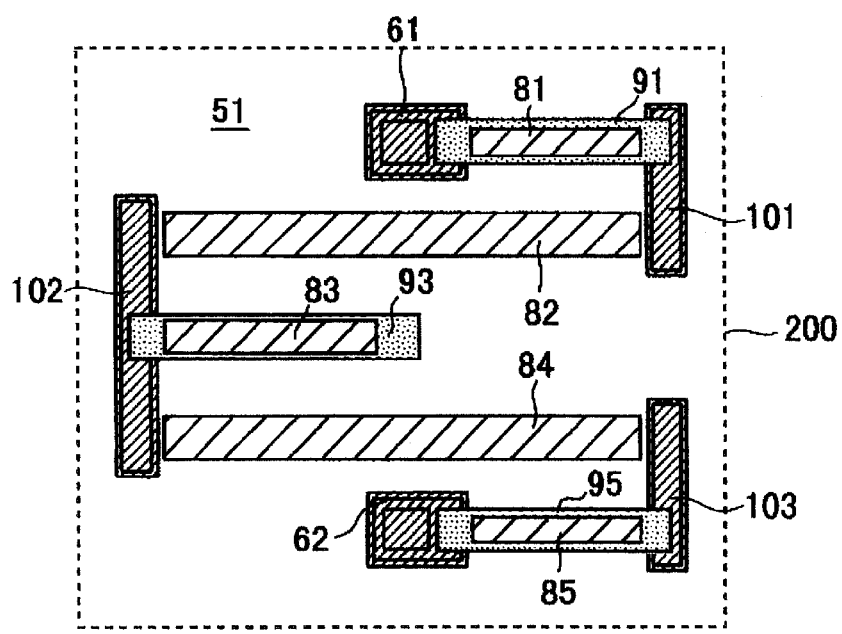

Next, an aluminum layer (1000 Å thick, for example) is applied by a suitable evaporative method. The aluminum layer is patterned by photo-etching to define the upper aluminum layers 81, 83, 85 of the independently displaceable members 71, 73, 75, respectively, and the aluminum layers 82, 84 of the independently displaceable members 72, 74, respectively (FIG. 17). The aluminum layers 81, 83, 85 are applied over the silicon dioxide layers 91, 93, 95, respectively.

Figure 18:
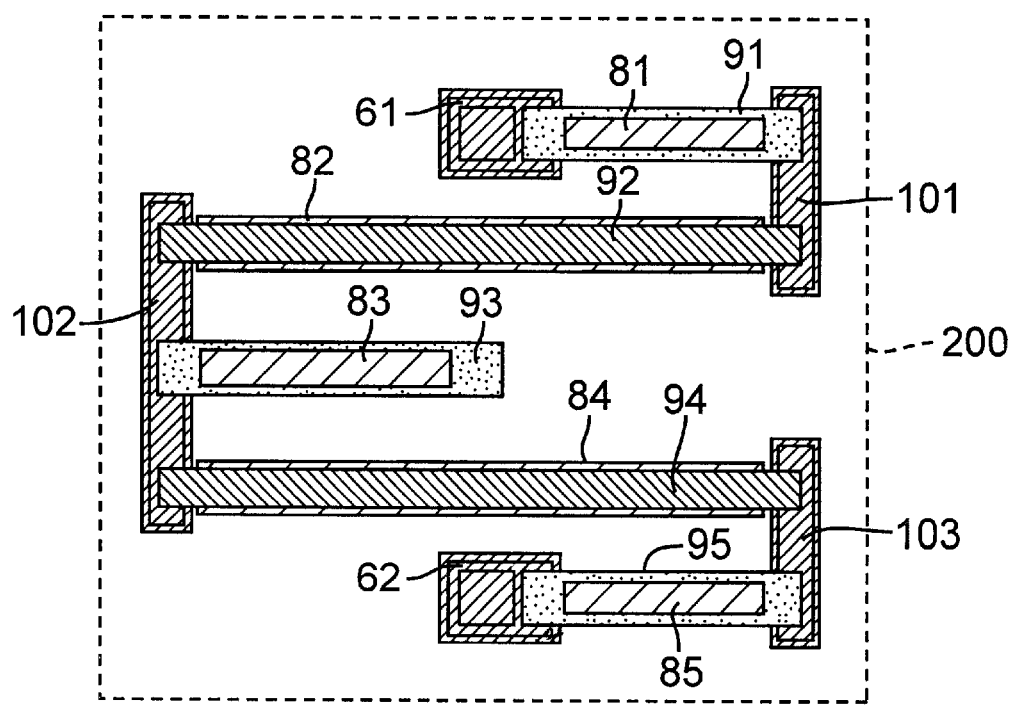

A silicon dioxide layer (2800 Å thick, for example) is applied by P-CVD and patterned by photo-etching to define the silicon dioxide layers 92, 94 of the independently displaceable members 72, 74, respectively (FIG. 18).

Figure 2B:
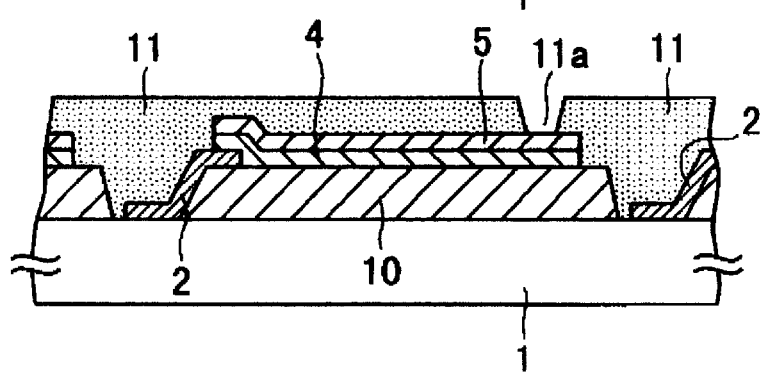
Figure 2C:
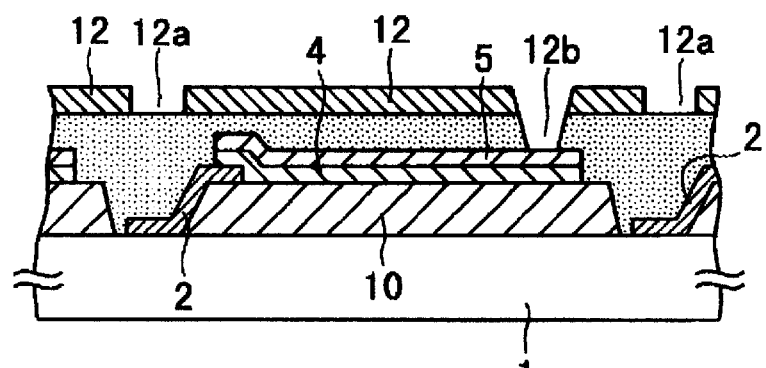
Figure 2D:
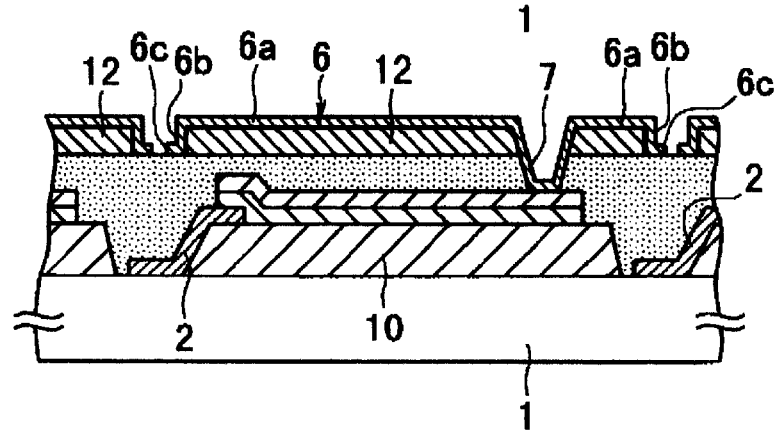

An aluminum layer (destined to become the reflector 55 and the reflector-connecting post 56) is deposited on the sacrificial layer, not shown in the drawing, by an appropriate evaporative method. This step is similar to what is shown in FIGS. 2(b)–2(d).

Finally, the substrate (with layers applied as described above) is "diced" into individual chips. The polyimide layer 211 and all other sacrificial layers are removed by ashing to complete manufacture of the radiation detector 50 shown in FIGS. 6–12.

The independently displaceable members 71–75 generate heat from absorption of IR radiation i incident from below the substrate. In response to heating, several events occur: (1) The independently displaceable member 71 bends such that its right-hand end is displaced downward (toward the substrate 51), relative to its left-hand end (FIG. 7). (2) The independently displaceable member 72 bends such that its left-hand end is displaced upward (away from the substrate 51), relative to its right-hand end (FIG. 8). (3) The independently displaceable member 73 bends such that its right-hand end is displaced downward (toward the substrate 51), relative to its left-hand end (FIG. 9). (4) The independently displaceable member 75 bends in a manner similar to the independently displaceable member 71. (5) The independently displaceable member 74 bends in a manner similar to the independently displaceable member 72.

The value of a displacement angle of the right-hand end of the independently displaceable member 73 is typically equal to the value of a displacement angle that would otherwise be obtained if the displaceable structure 54 were formed as a single independently displaceable member having a total length (L1+L2+L3), wherein L1 is the length of each of the members 71, 75 (FIGS. 4 and 7), L2 is the length of each of the members 72, 74 (FIG. 5), and L3 is the length of the member 73 (FIG. 6).

In this manner a large displacement angle can be obtained and detection sensitivity enhanced while maintaining the length of the displaceable structure 54 substantially shorter than the total length (L1+L2+L3). This is because the preceding-stage independently displaceable member and the subsequent-stage independently displaceable member are mechanically connected in series in a folding manner. Such a configuration also allows the distribution density of pixels, especially in the right and left directions, to be increased, thereby correspondingly increasing the spatial resolution (especially in the left and right directions) of the radiation detector. Furthermore, in this embodiment, the length of the displaceable structure 54 in the left and right directions is short, and the center-of-gravity of the displaceable structure 54 is located essentially at a point mid-way between the legs 52, 53. This configuration improves the balance and stability of the displaceable structure 54, decreases the force applied to the legs 52, 53, and thereby adds to the mechanical strength of the structure 54.

Because the reflector 55 and connecting members 76-78 are formed so as to include respective peripheral dropping portions surrounding the respective horizontal portions, the respective thicknesses of the respective horizontal portions of the reflector 55 and connecting members 76–78 can be reduced. Such a configuration allows a corresponding reduction in respective mass of the reflector 55 and connecting members 76–78, which allows a corresponding reduction in the respective mass of the independently displaceable members 71–75. The resulting increase in the sensitivity of each displaceable structure 54 provides a correspondingly increased sensitivity of the radiation detector.

Also, because each leg 52, 53 has a peripheral dropping portion, the thickness of the horizontal portion of each leg 52, 53 can be reduced. As a result, any displacement of the displaceable structure 54 is due solely to absorption by the structure 54 of incident IR radiation. Such a configuration increases the thermal insulation of the structure 54 from the substrate 51, thereby improving the signal-to-noise (S/N) ratio of the detector.

Desirably, the reflector 55, connecting members 76–78, and the legs 52, 53 are configured in the same manner (including dropping portions and lip portions) as the reflector 6 of the FIG. 1 embodiment. Alternatively, one or more of the reflector 55, connecting members 76–78, and legs 52–53 can be configured as shown in any of FIGS. 5(*a*)–5(*l*).

It will be understood that the radiation detector 50 according to this embodiment can be utilized in the imaging apparatus shown in FIG. 4.

Representative Embodiment 3

Figure 19:
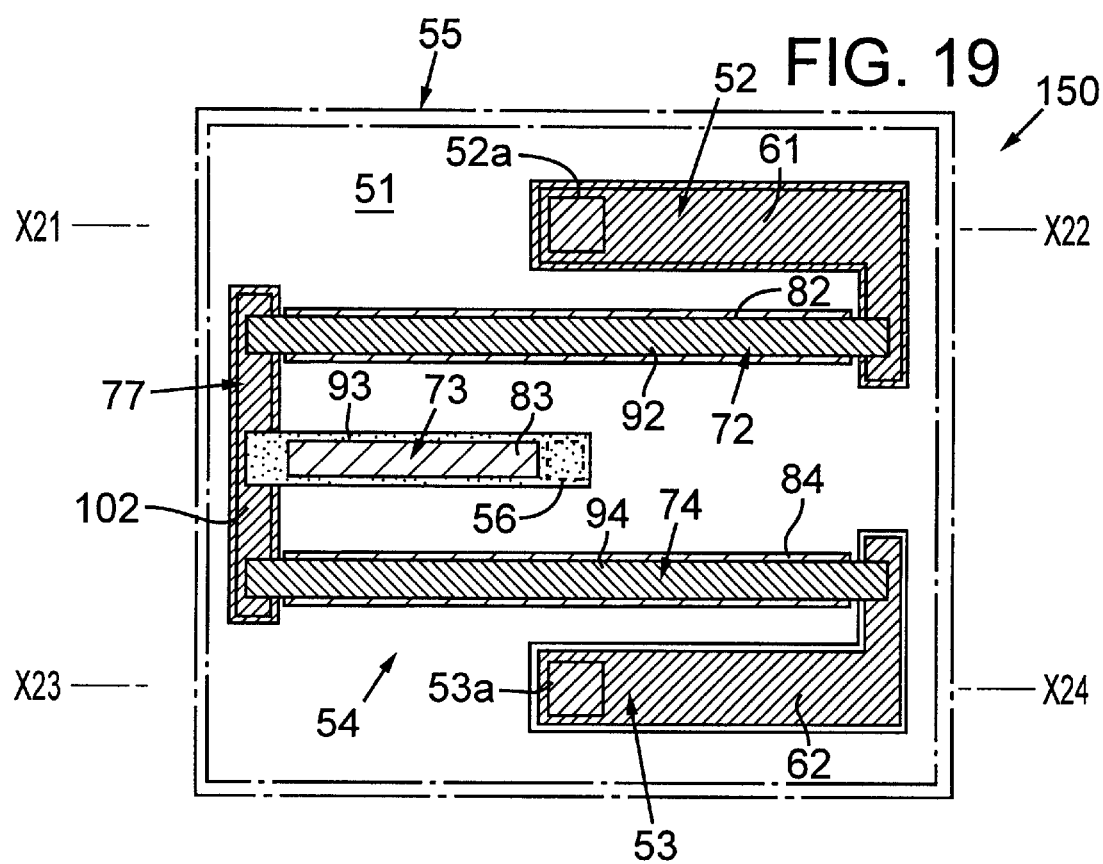
FIG. 19 is a schematic plan view of a pixel of a light-readout-type radiation detector according to Representative Embodiment 3.
Figure 20:
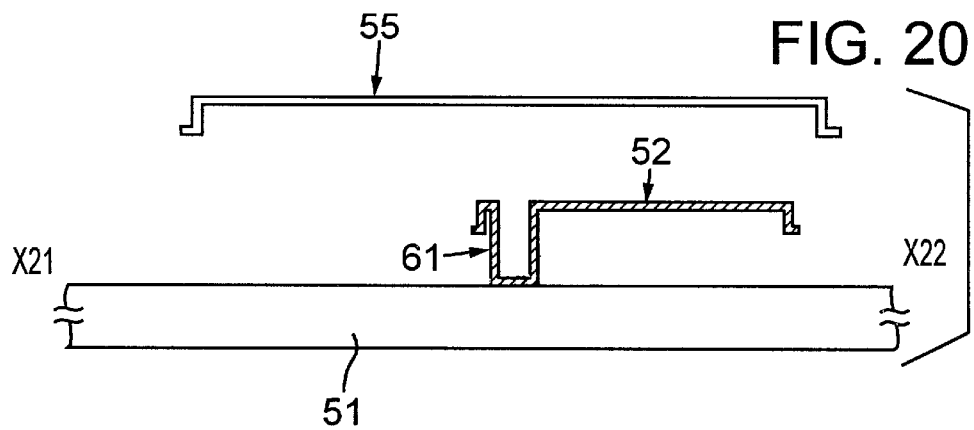
FIG. 20 is a schematic elevational section along the line X21–X22 of FIG. 19.

A light-readout-type radiation detector according to this embodiment is shown in FIG. 19 providing a plan view of a representative pixel (unit element) 150 of the detector. FIG. 20 is an elevational section along the line X21–X22 of FIG. 19. A section along the line X23–X24 of FIG. 19 is the same as shown in FIG. 20. In FIGS. 19 and 20, the same reference numerals are used for respective components that are the same as corresponding components shown in FIGS. 6–12; such components are not described further.

This embodiment differs from Representative Embodiment 2 mainly in that, in this embodiment, the independently displaceable members 71, 75 and the connecting members 76, 78 are omitted. Rather, the horizontal portion of the leg 52 in this embodiment is coextensive with the independently displaceable member 71 and connecting members 76 in Representative Embodiment 2, and the horizontal portion of the leg 53 in this embodiment is coextensive with the independently displaceable member 75 and connecting member 78 in Representative Embodiment 2.

With this embodiment, the same advantageous effects are achieved as with Representative Embodiment 2. Due to the added horizontal length of the legs 52, 53 in this embodiment, the thermal-insulation properties of the legs 52, 53 are enhanced, thereby improving the S/N ratio of the detector. Also, with lengthened legs 52, 53, the dropping portions extending peripherally around the horizontal portions of the legs 52, 53 are especially effective in allowing the membrane thickness of the legs 52, 53 to be reduced without sacrificing mechanical strength.

Representative Embodiment 4

Figure 21:
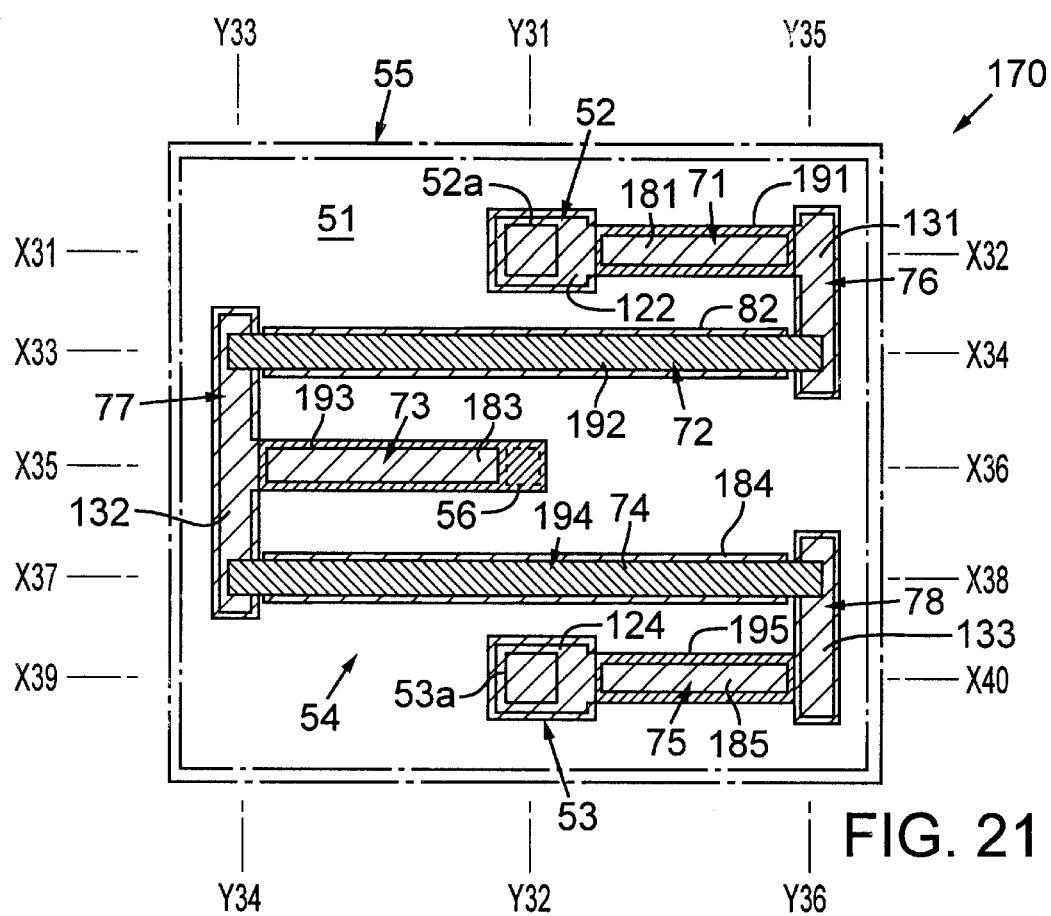
FIG. 21 is a schematic plan view showing a pixel of a light-readout-type radiation detector according to Representative Embodiment 4.
Figure 22:
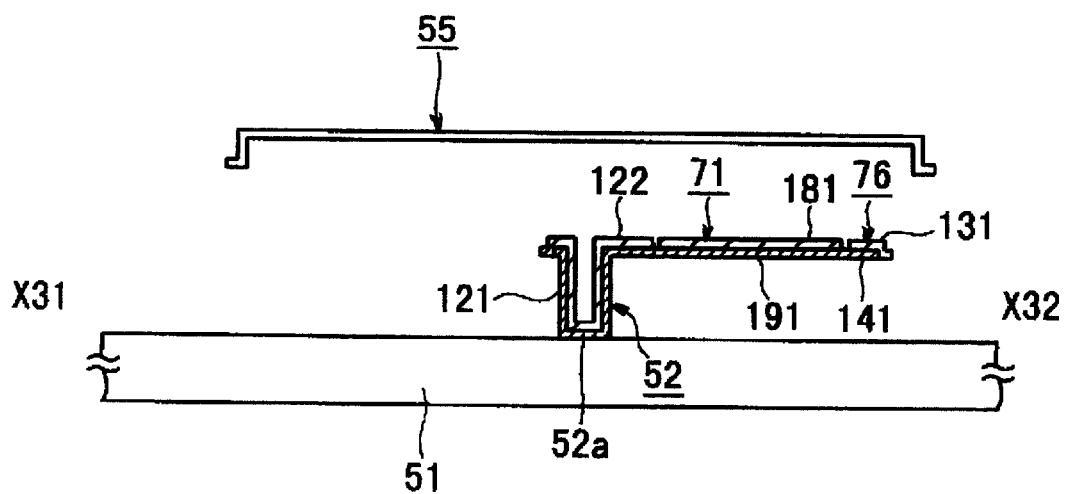
FIG. 22 is a schematic elevational section along the line X31–X32 of FIG. 21.
Figure 23:
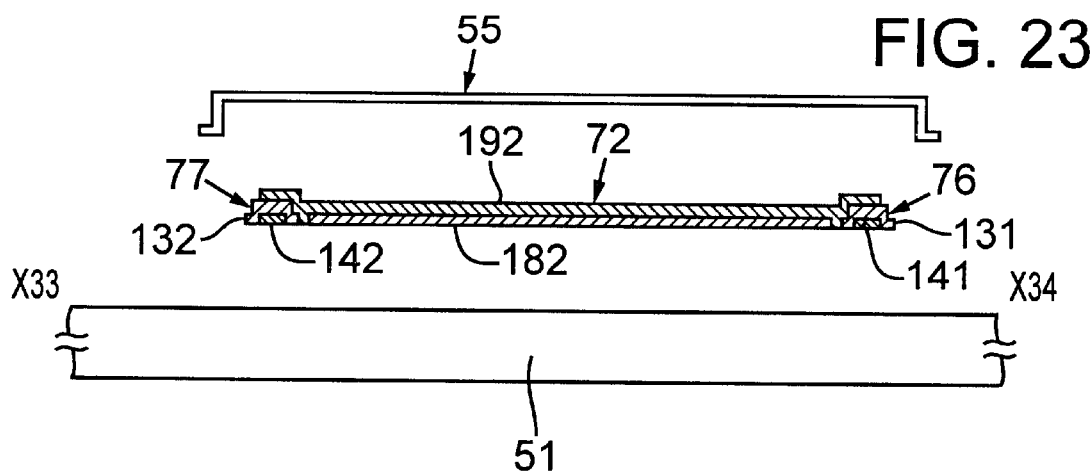
FIG. 23 is a schematic elevational section along the line X33–X34 of FIG. 21.
Figure 24:
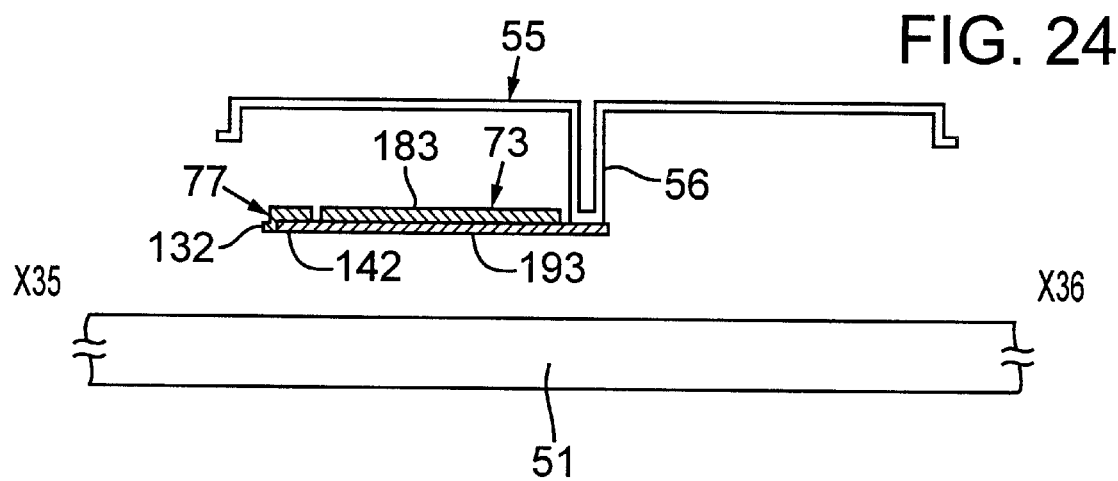
FIG. 24 is a schematic elevational section along the line X35–X36 of FIG. 21.
Figure 25:
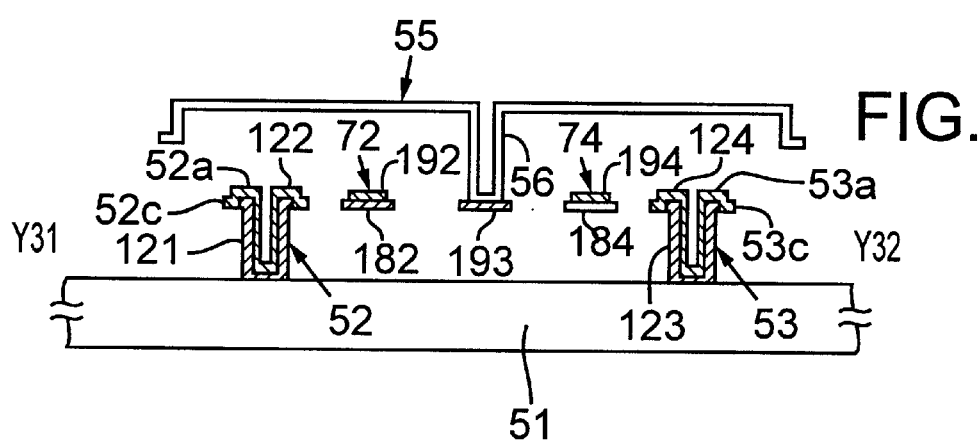
FIG. 25 is a schematic elevational section along the line Y31–Y32 of FIG. 21.
Figure 26:
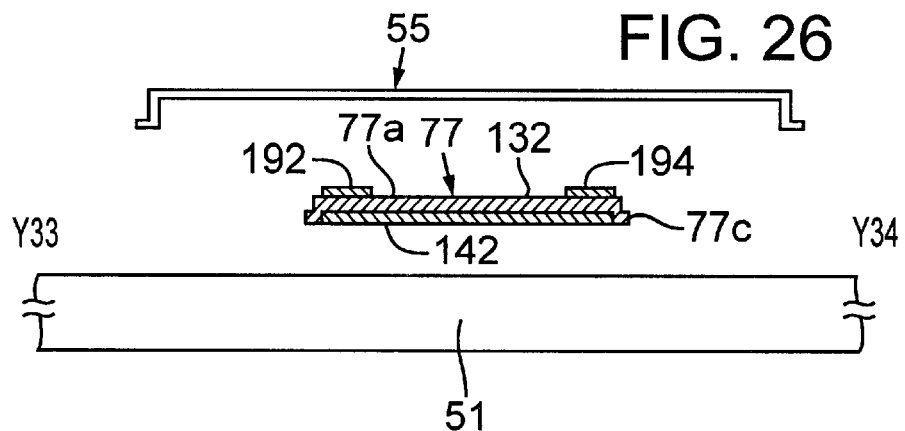
FIG. 26 is a schematic elevational section along the line Y33–Y34 of FIG. 21.
Figure 27:
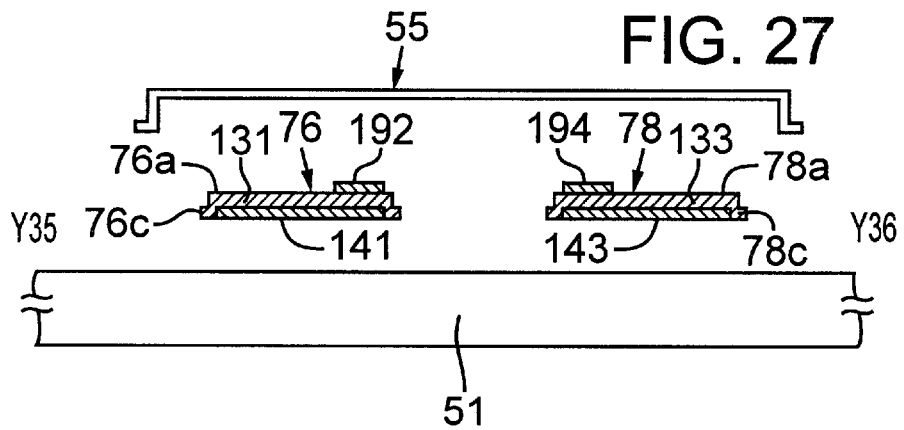
FIG. 27 is a schematic elevational section along the line X35–X36 of FIG. 21.

A light-readout-type radiation detector according to this embodiment is shown in FIG. 21 providing a schematic plan view of a representative pixel (unit element) of the detector. FIG. 22 is a schematic elevational section along the line X31–X32 of FIG. 21. FIG. 23 is a schematic elevational section along the line X33–X34 of FIG. 21. FIG. 24 is a schematic elevational section along the line X35–X36 of FIG. 21. FIG. 25 is a schematic elevational section along the line Y31–Y32 of FIG. 21. FIG. 26 is a schematic elevational section along the line Y33–Y34 of FIG. 21. FIG. 27 is a schematic elevational section along the line Y35–Y36 of FIG. 21. A section along the line X37–X38 of FIG. 21 is the same as shown in FIG. 23, and a section along the line X39–X40 of FIG. 21 is the same as shown in FIG. 21.

In FIGS. 21–27, the same reference numerals are used for respective components that are the same as corresponding components in the embodiment illustrated in FIGS. 6–12; such components are not described further. The following discussion is directed mainly to components distinctive to this embodiment.

The leg 52 is formed of an "upper" aluminum layer 122 deposited on top of a "lower" silicon dioxide layer 121 (FIG. 22). The resulting structure desirably has a configuration as shown in FIG. 5(*f*). Namely, as shown in FIG. 25, the leg 52 includes a horizontal portion 52*a* formed of the layers 121, 122 extending parallel to the substrate 51. Also, at least three edges along the periphery of the horizontal portion are configured such that the aluminum layer 122 drops down to cover the corresponding edges of the silicon dioxide layer 121. Also, the aluminum layer 122 desirably extends laterally outward as a lip portion 52*c*.

Similarly, the leg 53 is formed of an "upper" aluminum layer 124 deposited on top of a "lower" silicon dioxide layer 123 (FIG. 25). The resulting structure desirably has a configuration as shown in FIG. 5(*f*). Namely, as shown in FIG. 25, the leg 53 includes a horizontal portion 53*a* formed of the layers 123, 124 extending parallel to the substrate 51. Also, at least three edges along the periphery of the horizontal portion 53*a* are configured such that the aluminum layer 124 drops down to cover the corresponding edges of the silicon oxide layer 123. The aluminum layer 124 also desirably extends laterally outward as a lip portion 53*c*.

The connecting member 76 is formed of an "upper" aluminum layer 131 deposited on a "lower" silicon dioxide layer 141 (FIG. 27). The resulting structure desirably has a configuration as shown in FIG. 5(f). Namely, as shown in FIG. 27, the connecting member 76 includes a horizontal portion formed of the layers 131, 141 extending parallel to the substrate 51. Also, at the peripheral edges of the horizontal portion 76a (except at the connections to the independently displaceable member 71 and leg 52), the aluminum layer 131 drops down to cover the corresponding edges of the silicon dioxide layer 141. The aluminum layer 131 also desirably extends outward as a lip portion 76c.

Similarly, the connecting member 77 is formed of an "upper" aluminum layer 132 deposited on a "lower" silicon dioxide layer 142 (FIG. 26). The resulting structure desirably has a configuration as shown in FIG. 5(f). Similarly, the connecting member 78 is formed of an "upper" aluminum layer 133 deposited on a "lower" silicon dioxide layer 143 (FIG. 27). The resulting structure desirably also has a configuration as shown in FIG. 5(f).

The lower silicon dioxide layer 121 of the leg 52, the lower silicon dioxide layer 191 of the independently displaceable member 71, and the lower silicon dioxide layer 141 of the connecting member 76 desirably are formed as a contiguous silicon dioxide layer. Additionally, the lower silicon dioxide layer 123 of the leg 53, the lower silicon dioxide layer 195 of the independently displaceable member 75, and the lower silicon dioxide layer 143 of the connecting member 78 desirably are formed as a contiguous silicon dioxide layer; and the lower silicon dioxide layer 193 of the independently displaceable member 73 and the lower silicon dioxide layer 142 of the connecting member 77 desirably are formed as a contiguous silicon dioxide layer.

Connection of the independently displaceable members 72, 74 to the connecting members 76–78 is made directly by respective extensions of the silicon dioxide layers 192, 194, respectively, to respective planar portions 76a, 77a, 78a of the connecting members 76–78, respectively.

A representative method for fabricating a radiation detector according to this embodiment is shown in FIGS. 28–31 each showing the results of a respective step of the method. Each of FIGS. 28–31 is a schematic plan view of an exemplary pixel 200.

Figure 28:
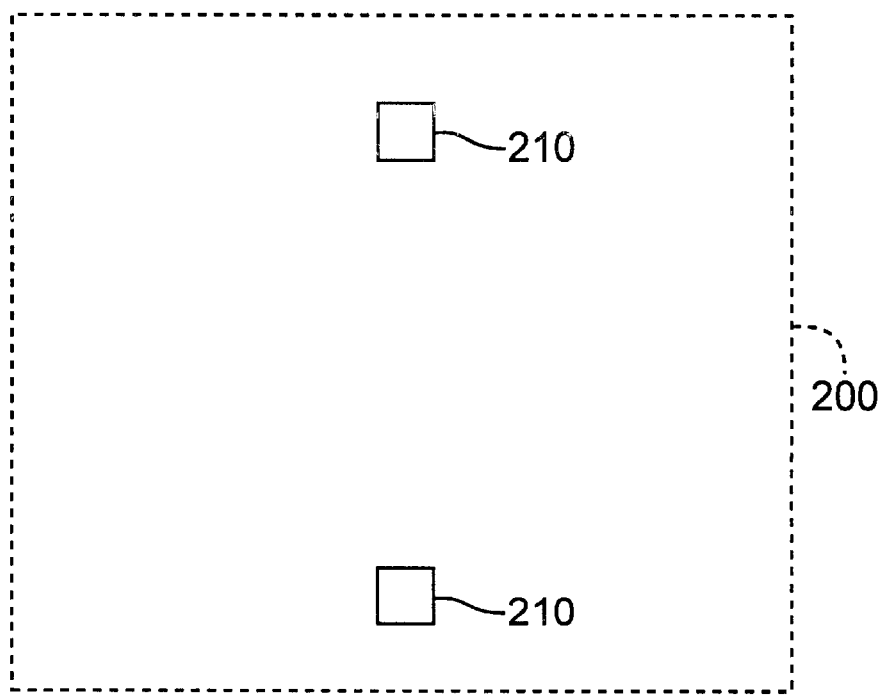
FIGS. 28–31 are schematic plan views each showing the result of a respective step in a method for fabricating a radiation detector according to Representative Embodiment 4.

In a first step, a resist (not shown) is deposited as a sacrificial layer on the entire surface of a silicon substrate 51, as shown in FIG. 28. Openings 210 are made in the resist by microlithography.

Figure 29:
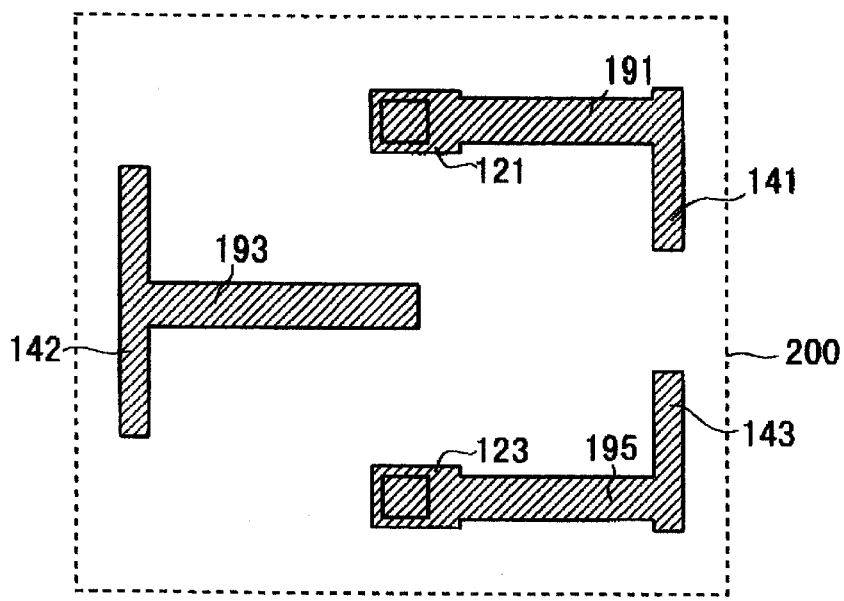

A silicon dioxide layer (having a thickness of 3000 Å, for example) is deposited by P-CVD. The silicon dioxide layer is patterned to leave silicon dioxide regions destined to become the "lower" silicon dioxide layers 121, 123 of the legs 52, 53, respectively; the "lower" silicon dioxide layers 191, 193, 195 of the independently displaceable members 71, 73, 75, respectively; and the "lower" silicon dioxide layers 141–143 of the connecting members 76–78, respectively (FIG. 29).

Figure 30:
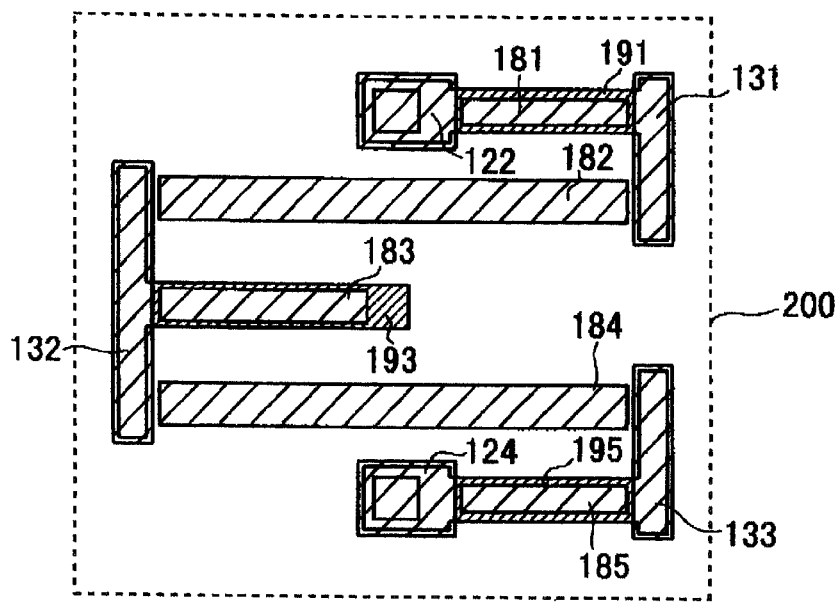

An aluminum layer (having a thickness of 1500 Å, for example) is deposited by an appropriate evaporative method. The aluminum layer is patterned by photo-etching to leave regions of aluminum destined to become "upper" aluminum layers 181, 183, 185 of the independently displaceable members 71, 73, 75, respectively; the "lower" aluminum layers 182, 184 of the independently displaceable members 72, 74, respectively; and the "upper" aluminum layers 131–133 of the connecting members 76–78, respectively (FIG. 30). The regions left to form the aluminum layers 122, 124 and 131–133 are sufficiently large to overlap the respective underlying silicon dioxide layers 121, 123 and 141–143.

Figure 31:
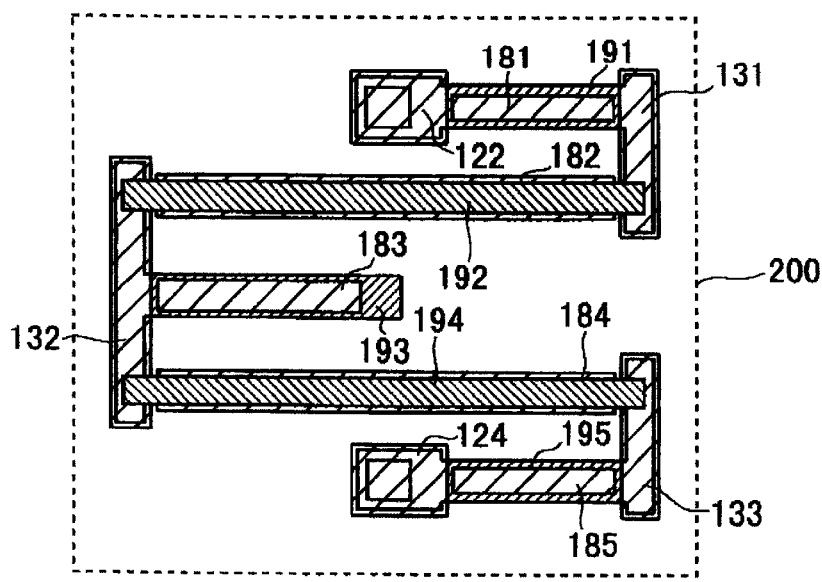

A silicon dioxide layer is deposited by P-CVD and patterned by photo-etching to form the silicon dioxide layers 192, 194 of the independently displaceable members 72, 74, respectively (FIG. 31).

Next, an aluminum layer is deposited by an appropriate evaporative technique, as described above with reference to FIGS. 2(b)–2(d), and patterned by photo-etching to form the aluminum reflector 55 and the reflector-connecting post 56 on the sacrificial layer (not shown).

Finally, the substrate 51 is diced into individual chips, and the polyimide layer 211 and all other sacrificial layers are removed by ashing to complete manufacture of a radiation detector according to this embodiment.

Since the reflector 55 in this embodiment (as the reflector 6 in the FIG. 1 embodiment) is configured with a dropping portion extending around the periphery of the horizontal surface of the reflector, it is possible to reduce the thickness of the horizontal surface of the reflector 55. Similarly, since the connecting members 76–78 desirably are formed in a manner as shown in FIG. 5(f), the thickness of the respective horizontal surfaces of the connecting members 76–78 can be reduced. Such reductions in thickness allow the respective masses of the reflector 55 and connecting members 76–78 to be reduced. Similarly, the thickness of the independently displaceable members 71–75 can be reduced. Such reductions in mass and thickness provide an enhanced sensitivity of the detector.

Furthermore, since the layers comprising the legs 52, 53 are configured in a manner as shown in FIG. 5(f), the thickness of each leg 52, 53 can be reduced. This increases the thermal insulation between the substrate 51 and the displaceable structure 54, and the displacement range of the displaceable structure 54, thereby enhancing the S/N ratio with which IR radiation is detected.

Other benefits and advantages realized with the other representative embodiments described above also are realized with a detector according to this embodiment.

Representative Embodiment 5

Figure 32A:
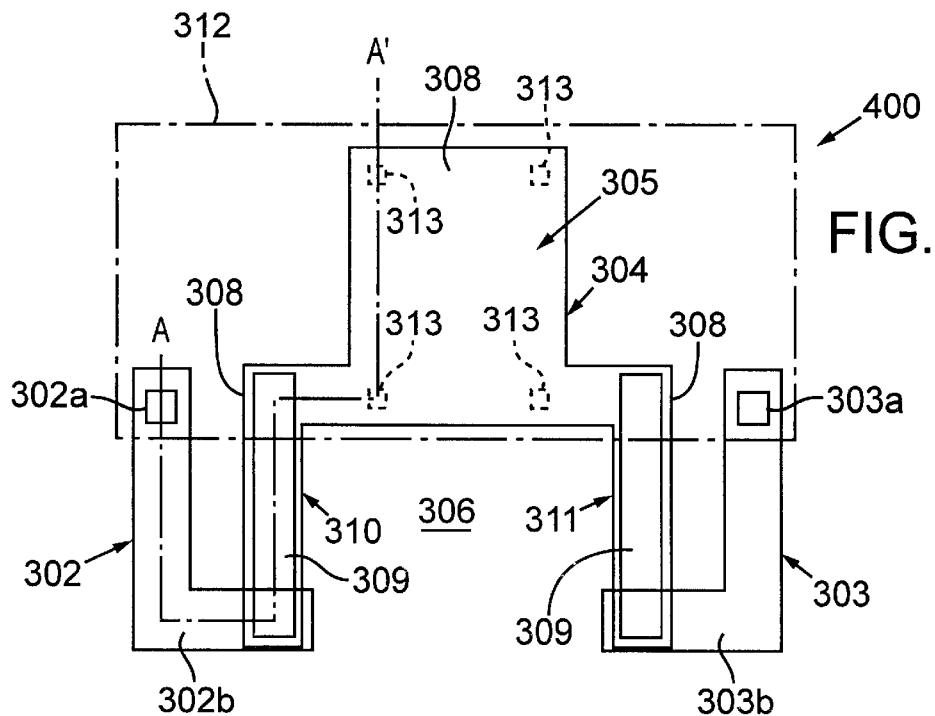
FIG. 32(a) is schematic plan view of a pixel of a light-readout-type radiation detector according to Representative Embodiment 5.
Figure 32B:
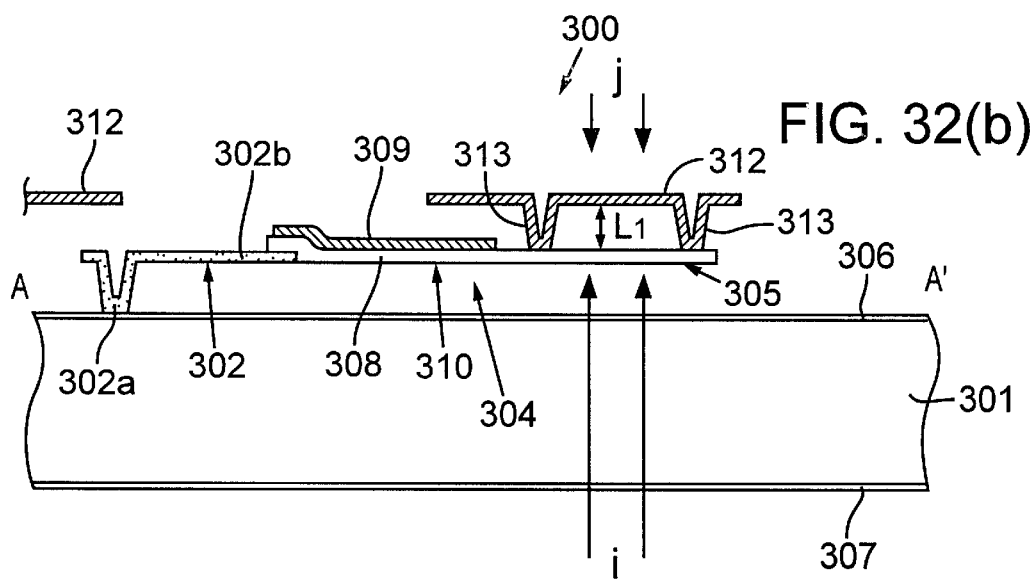
FIG. 32(b) is a schematic elevational section along the line A–A' of FIG. 32(a).

A representative pixel (unit element) of a light-readout-type radiation detector 300 according to this embodiment is shown in FIGS. 32(a)–32(b). FIG. 32(a) is a schematic plan view, and FIG. 32(b) is a schematic elevational section along the line A–A' of FIG. 32(a).

This radiation detector 300 includes a substrate 301 (such as a silicon wafer) that is transmissive to the radiation to be detected (e.g., IR radiation). Each pixel comprises two legs 302, 303 extending upward from the substrate 301. A displaceable structure 304 is supported by the legs 302, 303 so as to extend horizontally over the surface of the substrate 301. The displaceable structure 304 includes an IR-absorbing region 305 that exhibits heating as it absorbs incident IR radiation "i". The heating causes displacement of the displaceable structure 304 relative to the substrate 301.

Desirably, the substrate 301 is coated on both surfaces with respective IR-reflection-inhibiting layers 306, 307. However, the presence of the layers 306, 307 is not required.

The reference numerals 302a and 303a denote respective contact surfaces of the legs 302, 303 with the IR-reflection-inhibiting layer 306 on the substrate 301. The contact surfaces 302a, 303a extend from respective horizontal portions 302b, 303b of the legs 302, 303, which have L-shaped plan profiles, respectively. The legs 302, 303 desirably are formed of a layer of silicon dioxide, which is an excellent thermal insulator.

The displaceable structure 304 comprises first and second displaceable members 310, 311, respectively. Each displaceable member 310, 311 is formed of overlapping layers 308, 309 and forms a respective cantilever of which one end is connected to an end of a respective horizontal portion 302b, 303b of a respective leg 302, 303. Thus, the displaceable structure 304 is horizontally displaced from the substrate 301. The layers 308, 309 are formed of respective substances having different coefficients of thermal expansion. Thus, the displaceable members 310, 311 constitute thermal bimorph structures. Upon absorbing heat, the displaceable members 310, 311 tilt upward if the coefficient of thermal expansion of the "lower" layer 308 is larger than the coefficient of thermal expansion of the "upper" layer 309; the displaceable members 310, 311 tilt downward if the coefficient of thermal expansion of the "lower" membrane 308 is less than the coefficient of thermal expansion of the "upper" layer 309. Desirably, the layer 308 is of silicon nitride (having a thickness of 3000 Å for example), and the layer 309 is of aluminum (having a thickness of 1000 Å for example).

The IR-absorbing region 305 reflects a portion of the incident IR radiation i. Desirably, the IR-absorbing region 305 reflects about 33% of the incident IR radiation. The IR-absorbing region 305 extends from the displaceable members 310, 311 and desirably has a planar configuration. For example, the IR-absorbing region 305 can be formed by respective extensions of the layer 308 directly from the displaceable members 310, 311.

The displaceable structure 304 includes a planar member 312 having a thickness of 4000 Å for example. The planar member 312 extends substantially parallel to but displaced from the IR-absorbing region 305 by a distance L1. To such end, the planar member 312 is attached to the IR-absorbing region 305 via connecting posts 313. The planar member 312 desirably covers at least the entire IR-absorbing region 305, and desirably has an area larger than that of the IR-absorbing region 305. Desirably, the position of the planar member 312 is constant relative to the IR-absorbing region 305 regardless of any displacement of the displaceable structure 304. The connecting posts 313 can be formed by directly extending the aluminum layer constituting the planar member 312. Such a configuration is especially achievable by mounting the planar member 312 to the IR-absorbing region 305 using one or more connecting posts 313.

Relative to the IR-absorbing region 305, the planar member 312 desirably is situated at a distance $L1 = n\lambda_0/4$, where n is an odd number and $\lambda_0$ is a median wavelength of a desired range of wavelengths of incident IR radiation i. In an example, $\lambda_0$, n, and L1 are 10 μm, 1, and 2.5 μm, respectively. However, this embodiment is not limited specifically to these values. The planar member 312 desirably is formed from an aluminum layer having a thickness of 4000 Å for example. The planar member 312 at least serves as a reflector of readout light "j", and desirably also serves as a reflector of incident IR radiation i. For example, one side of the planar member 312 can be the IR reflector, and the opposite side can be the readout-light reflector.

The pixels typically are arranged on the substrate 301 in a one- or two-dimensional array. Each pixel includes a respective displaceable structure 304 and respective legs 302, 303.

The radiation detector 300 of this embodiment can be fabricated using semiconductor-fabrication technology. Fabrication would include steps such as layer-forming and layer-patterning, including forming and removal of sacrificial layers. The fabrication method is exemplified by the following steps.

Initially, the IR-reflection-inhibiting layers 306, 307 are coated on both sides of a silicon substrate 301, and a resist (not shown, but serving as a sacrificial layer) is deposited on the IR-reflection-inhibiting layer 306. Using microlithography, openings are formed in the resist at locations corresponding to respective locations of the contact points 302a, 303a of the legs 302, 303, respectively. A silicon dioxide layer is applied using P-CVD, and patterned by photo-etching to form the leg 302. A silicon nitride layer is applied using P-CVD, and patterned by photo-etching to form the membrane 308. An aluminum layer is then deposited using a suitable evaporative technique. The aluminum layer is patterned using photo-etching to form the aluminum layer 309. Another sacrificial resist layer is applied, and openings corresponding to the locations of the connecting posts 313 are formed in the resist. An aluminum layer is applied (using a suitable evaporative technique) that is destined to become the planar member 312 and connecting posts 313. The aluminum layer is patterned by photo-etching to form the planar member 312. The substrate 301 is then diced to divide it into its constituent chips. Finally, the sacrificial resist layers are removed by ashing or other suitable technique to complete fabrication of the detector 300.

With the detector 300, a portion of the incident IR radiation i (propagating from below) is absorbed by the IR-absorbing region 305. Remaining IR radiation i (passing through the IR-absorbing region 305) is reflected by the planar member 312 and returned to the IR-absorbing region 305. Some of this returned radiation reflects from the IR-absorbing region 305 back to the planar member 312, and so on, to produce an interference between the IR-absorbing region 305 and the planar member 312. To such end, the distance L1 between the planar member 312 and the IR-absorbing region 305 desirably is an odd-integer multiple of ¼ of the median wavelength (within a desired wavelength range) of the infrared radiation i. Such a condition achieves maximal absorption of IR radiation by the IR-absorbing region 305. Hence, even if the thickness of the IR-absorbing region 305 is reduced and/or its thermal capacity is decreased, the rate at which incident IR radiation is absorbed by the region 305 can be increased. As a result, both detection sensitivity and the detection response are improved.

Heat generated in the IR-absorbing region 305 is conducted to the displaceable members 310, 311, causing the displaceable members 310, 311 to tilt downward and thus causing the planar member 312 to tilt toward the surface of the substrate 301. The degree of tilt is a function of the amount of incident IR radiation i absorbed. Meanwhile, the relative positional relationship (namely, the distance L1) of the planar member 312 and the IR-absorbing region 305 is maintained. Hence, readout light j radiated to the planar member 312 from above is reflected in a direction corresponding to the amount of incident IR radiation i received by the pixel.

Since the IR-absorbing region 305 (in which the amount of IR radiation absorbed is larger than the amount of IR radiation reflected therefrom) is provided on the displaceable structure 304, the displaceable structure 304 exhibits a large displacement even if the amount of incident IR radiation is unchanged. This is the case when the displaceable structure 304 performs an IR-reflecting role and the IR-absorbing region 305, for example, is provided in the substrate 301. With such a configuration, detection sensitivity is enhanced.

Since the IR-absorbing region 305 is provided on the displaceable structure 304, heat generated in the IR-absorbing 305 is effectively conducted to the displaceable members 310, 311. This configuration also provides enhanced detection sensitivity.

Since the distance L1 between the IR-absorbing region 305 and the planar member 312 is kept constant, notwithstanding any displacement of the displaceable structure 304, stable spectral sensitivity of the detector is achieved.

Since the planar member 312 serves both as an IR reflector and a reflector of readout light, the overall structure is simplified and inexpensively manufactured.

Representative Embodiment 6

Figure 33:
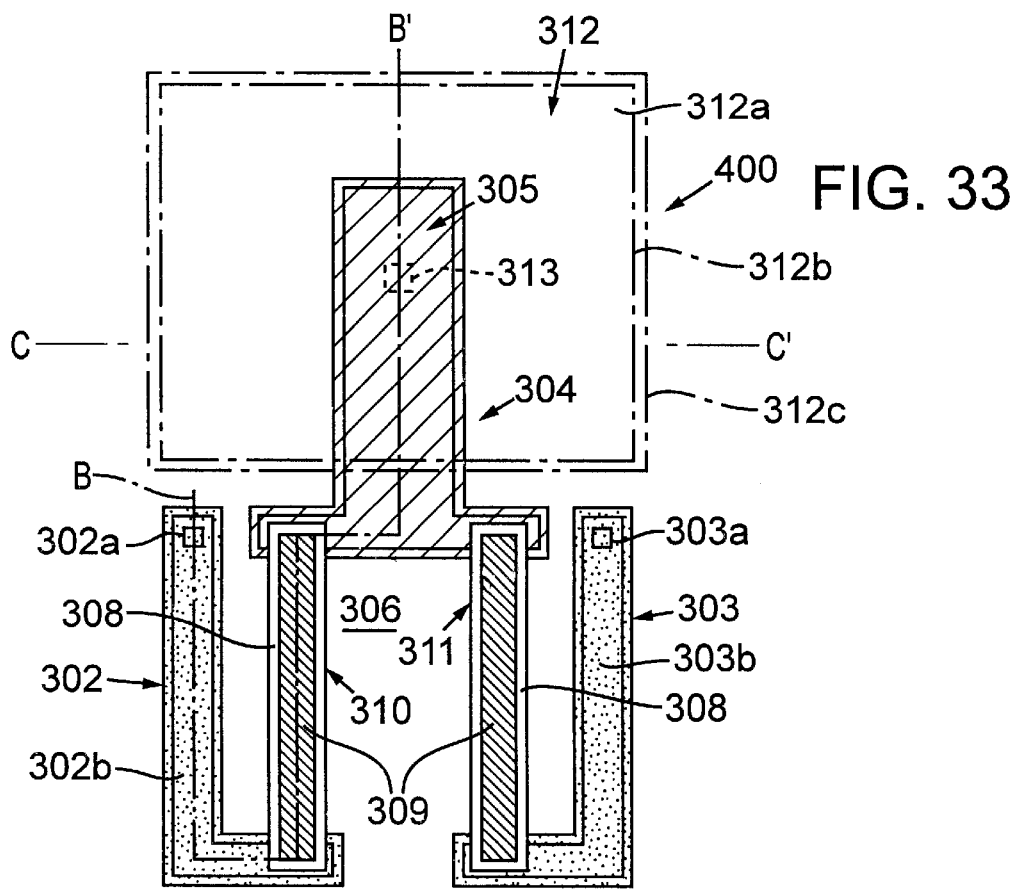
FIG. 33 is a schematic plan view of a pixel of a light-readout-type radiation detector according to Representative Embodiment 6.
Figure 34:
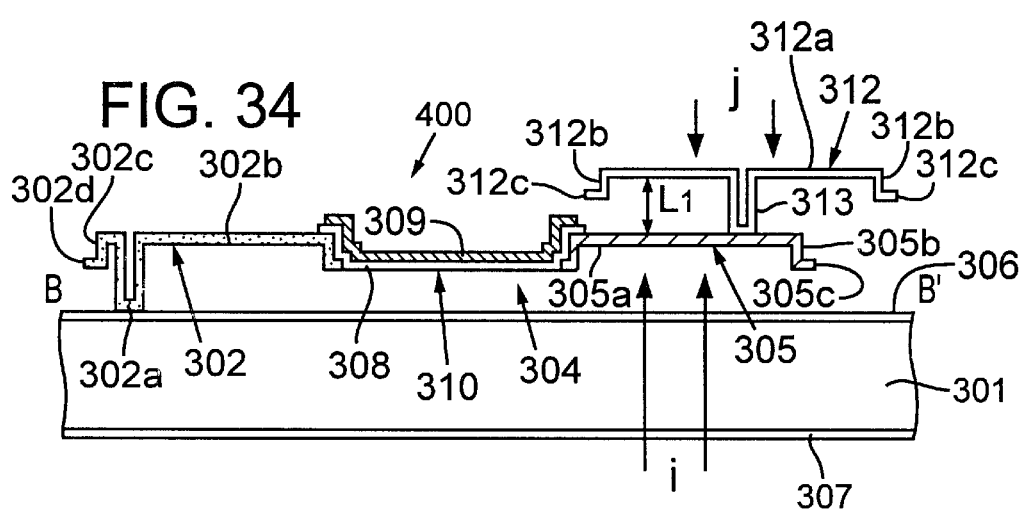
FIG. 34 is a schematic elevational section along the line B–B' of FIG. 33.
Figure 35:
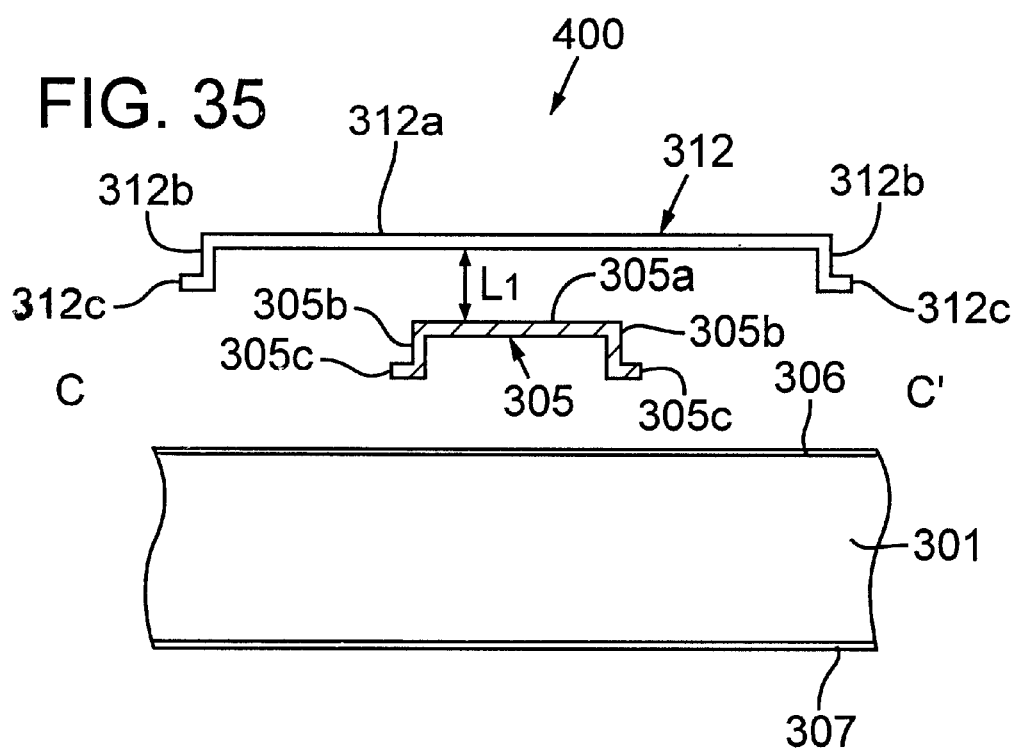
FIG. 35 is a schematic elevational section along the line C–C' of FIG. 33.

This embodiment is shown in FIG. 33 that provides a schematic plan view of a representative pixel (unit element) of a light-readout-type radiation detector 400. FIG. 34 is a schematic elevational section along the line B–B' of FIG. 33, and FIG. 35 is a schematic elevational section along the line C–C' of FIG. 33. In FIGS. 33–35, components that are the same as described above in Representative Embodiment 5 have the same respective reference numerals and are not described further. The following discussion is directed mainly to the differences between the radiation detector 400 of this embodiment and the radiation detector 300 of FIG. 32(a).

In the radiation detector 400, the planar member 312 normally extends parallel with the substrate 301 and includes a dropping (or rising) portion 312b extending downward from a planar portion 312a around substantially all or a portion of the periphery of the planar portion 312a. The planar member 312 also includes a lip portion 312c extending laterally outward slightly from the dropping (or rising) portion 312b. The lip portion 312c can be omitted if desired. In any event, since the planar portion 312a is reinforced by the dropping (or rising) portion 312b, the thickness of the planar portion 312a can be reduced without compromising strength of the planar portion 312a. Thus, the thermal capacity of the planar member 312 can be reduced without the planar member 312 exhibiting deformation caused by insufficient mechanical strength. This configuration also facilitates constancy of the distance L1 while achieving an improved detection responsiveness and a more stable spectral response characteristic.

The IR-absorbing region 305 desirably is a silicon nitride layer formed separately from the silicon nitride layer 308 (the latter being the lower layer of the displaceable members 310, 311). The IR-absorbing region 305, similar to the planar member 312, includes a dropping portion 305b extending from a planar portion 305a around all or a portion of the periphery of the planar portion 305a, and a lip portion 305c extending laterally outward from the dropping portion 305b. The lip portion 305c can be omitted if desired. Since the planar portion 305a is reinforced by the dropping portion 305b, the thickness of the planar portion 305a can be reduced without compromising the strength of the planar portion 305a. This allows the thermal capacity of the IR-absorbing region 305 to be reduced while preventing deformation of the IR-absorbing region 305, thereby enhancing detection response and providing a more stable spectral response characteristic, while maintaining constancy of the distance L1.

The leg 302 also includes a planar portion 302b extending parallel to the substrate 301 and a dropping (or rising) portion 302c extending from the planar portion 302b around all or a portion of the periphery of the planar portion. If desired, the dropping portion 302c can include a lip portion 302d extending laterally outward from the dropping portion 302c. Since the planar portion 302b is reinforced structurally by the dropping portion 302c, the thickness of the planar portion 302b can be reduced without compromising the strength of the planar portion 302b, thereby enhancing the thermal insulating properties of the leg 302.

Other advantages achieved by the detector 400 are similar to those achieved by the detector 300 discussed in the previous representative embodiment.

The radiation detector 400 can be fabricated using semiconductor-fabrication technology involving techniques such as layer formation and patterning, as well as formation, patterning, and removal of sacrificial layers. Furthermore, the radiation detector 400 can be used in an apparatus as shown in FIG. 4.

Representative Embodiment 7

Figure 36:
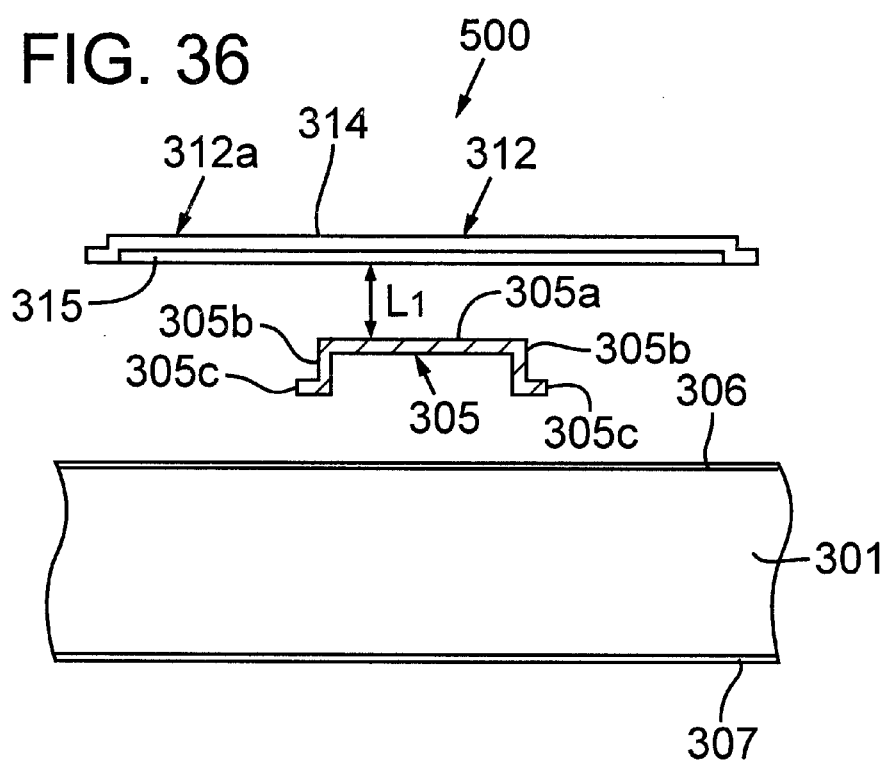
FIG. 36 is a schematic elevational section of a pixel of a light-readout-type radiation detector according to Representative Embodiment 7.

A radiation detector 500 according to this embodiment is shown in FIG. 36 (providing a schematic elevational section of a representative pixel). In FIG. 36, components that are the same as respective components discussed above in Representative Embodiment 6 have the same respective reference numerals and are not described further.

The following discussion is directed mainly to the differences between the radiation detector 500 and the radiation detector 400.

In the detector 500, the planar member 312 has a planar portion 312a that is composed of two layers 314, 315. The upper layer 314 serves to reflect readout light j, and the lower layer 315 serves to reflect incident IR radiation i. The upper layer 314 covers the edges of the lower layer 315 around at least a portion of the periphery of the planar portion 312a. Such edge covering by the upper layer 314 also can extend outward slightly, as shown in FIG. 36. Hence, the planar portion 312a is reinforced structurally, allowing the thickness of the planar portion 312a to be reduced without compromising its mechanical strength. Thus, it is possible to decrease the thermal capacity of the planar member 312 without deforming the planar member 312. This enhances the detection response of the detector 500 and provides the detector with a more stable spectral response characteristic by keeping the distance L1 constant. The edge configuration of the planar member 312 also can be applied to the IR-absorbing region 305 and the leg 302.

Other advantages as achieved by the detector according to the preceding representative embodiment are also achieved by a detector 500 according to this embodiment.

Representative Embodiment 8

A radiation detector 600 according to this embodiment is shown in FIG. 37 providing a schematic elevational section of a representative pixel of the detector. In FIG. 37, components that are the same as respective components in the preceding representative embodiment have the same respective reference numerals and are not described further.

The following discussion is directed mainly to the differences between the radiation detector 600 and the detector 500 of the previous representative embodiment.

The radiation detector 600 lacks the planar member 312 of the previous representative embodiment. Instead, the detector 600 comprises a mask (light shield) 340 for blocking readout light j. The detector also includes an IR-reflecting region 341, defined in the mask 340, that faces the IR-absorbing region 305 and is separated from the IR-absorbing region 305 by the distance L1. The detector 600 also includes a semi-transparent mirror 342 (for reflecting readout light j) affixed to the IR-absorbing region 305, and a readout-light reflector 343 formed on the IR-reflection-inhibiting layer 306. The reflector 343 faces the mirror 342.

The mask 340 defines an opening 340a in a region corresponding to the location of the mirror 342. The mask 340 blocks light other than interference light (among the readout light) radiating from the semitransparent mirror 342. The mask 340 can be made of a material such as gold black or platinum black.

The IR-reflecting region 341 desirably is an aluminum layer. The semi-transparent mirror 342 desirably is composed of a silicon dioxide layer (transparent to visible light) and a metal layer such as titanium thinly coated on the silicon dioxide layer by, e.g., sputtering.

Whenever readout light j is irradiated onto the semi-transparent mirror 342, some of the readout light j is reflected by the semitransparent mirror 342 and becomes reflected light. The remaining readout light j is irradiated onto the semi-transparent mirror 342 through which the readout light passes. The readout light j is reflected by the reflector 343 back onto the semi-transparent mirror 342. A portion of the readout light j is re-radiated into the semi-transparent mirror 342 from below. This readout light passes through the semi-transparent mirror 342 and becomes transmitted light. The difference between the length of an optical path of transmitted light and the path length of the reflected light is twice as long as the distance d between the semi-transparent mirror 342 and the reflector 343. This condition produces interference. The intensity of the resulting interference fringes corresponds to this difference in optical-path length (and thus corresponds to the displacement of the displaceable structure 304).

Since the IR-reflecting region 341 is affixed to the substrate 301 via the mask 340, the distance L1 changes with changes in the displaceable structure 304. Consequently, the stability of the spectral response characteristic of this embodiment may be slightly less than the FIG. 32(a) embodiment. However, other advantages realized with the FIG. 32(a) embodiment also are realized with the FIG. 37 embodiment.

Certain aspects of the use of a readout-light system together with an IR reflector are disclosed in Japanese Kokai (laid open) patent document no. Hei 10-253447.

Representative Embodiment 9

Figure 38A:
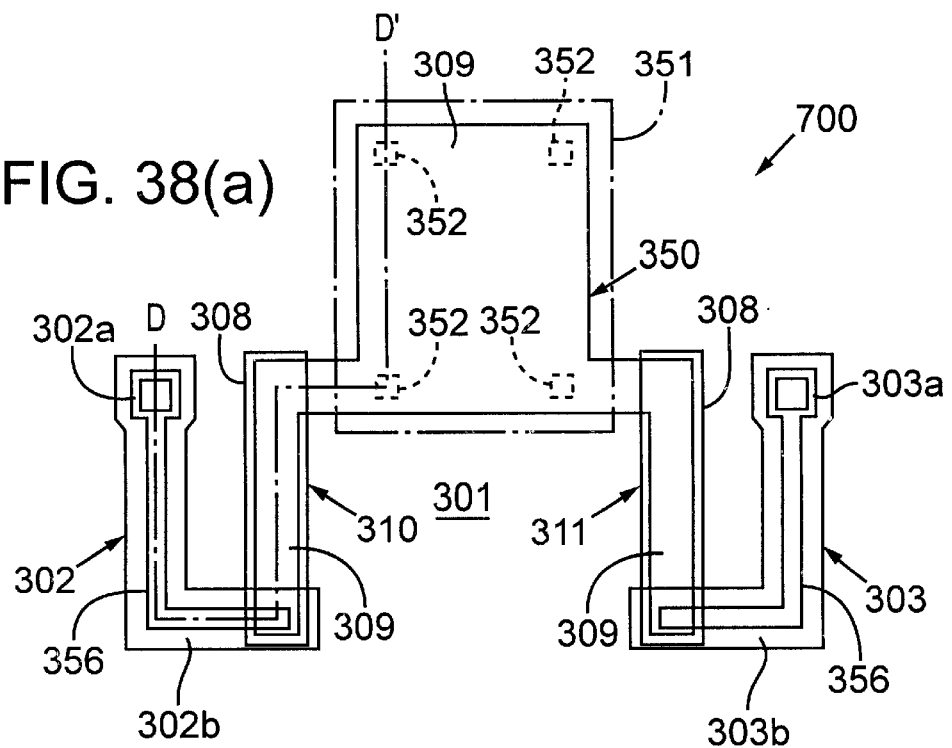
FIG. 38(a) is schematic plan view of a pixel of a capacitor-type radiation detector according to Representative Embodiment 9.
Figure 38B:
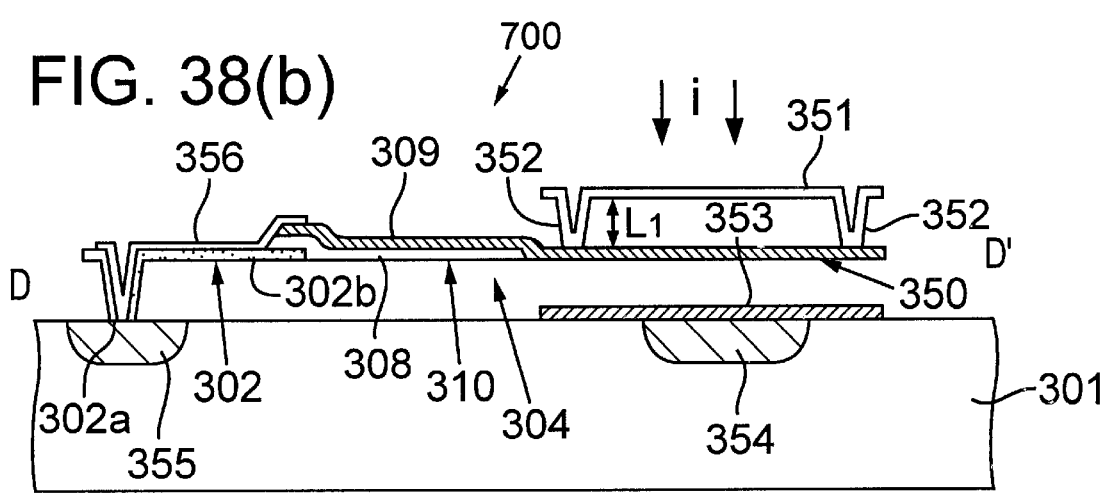
FIG. 38(b) is a schematic elevational section along the line D–D' of FIG. 38(a).

A capacitor-type radiation detector 700 according to this embodiment is shown in FIGS. 38(a)–38(b) that show a pixel (unit element) of the detector 700. FIG. 38(a) is a schematic plan view of the pixel, and FIG. 38(b) is a schematic elevational section along the line D–D' of FIG. 38(a). In FIGS. 38(a)–38(b), components that are the same as respective components in the FIG. 36(a) embodiment have the same respective reference numerals and are not described further. The following discussion is directed to the differences between these two embodiments.

In the radiation detector 700, IR-reflection-inhibiting layers 306, 307 are not present on both sides of the silicon substrate 301. A planar member 350 is attached to respective top portions of the displaceable members 310, 311. The planar member 350 serves as a movable electrode, specifically a displacement-readout member used for obtaining a change in capacitance corresponding to a displacement of the displaceable structure 304. The planar member 350 also serves as an IR reflector that almost totally reflects incident IR radiation i. The planar member 350 can be used as a movable electrode by situating the IR-reflective surface opposite an IR-absorption layer 351 of the member 350, as briefly discussed later.

The IR-absorption layer 351 desirably has a planar profile and is formed of a silicon dioxide layer having a thickness of 3000 Å for example. The IR-absorption layer 351 is parallel with the planar member 350 and separated from the planar member 350 by the distance L1. To such end, the IR-absorption layer 351 is attached to the planar member 350 by at least one connecting post 352. Thus, the IR-absorption layer 351 is attached to the displaceable structure 304. The planar member 350 is made a part of the displaceable structure 304 so that the relative positions of the planar member 350 and the IR-absorption layer 351 are maintained substantially constant regardless of the displacement of the displaceable structure 304.

A fixed electrode 353 composed of a metal layer is provided on the substrate 301 facing the planar member 350. The upper surface of the fixed electrode 353 may be covered by a dielectric membrane if necessary. In the substrate 301, a diffusion zone 355 is formed beneath the planar portions 302b, 303b of the legs 302, 303, respectively. A diffusion zone 354 is formed beneath and connected to the fixed electrode 353. A wiring layer 356 connecting the aluminum layer 309 with the wiring layer 356 (additionally connecting the diffusion zone 355 with the planar member 350) is formed on the legs 302, 303. Openings are formed in contact portions 302a, 303a, respectively, of the legs. The wiring layer 356 is electrically connected to the diffusion zone 355 via these openings.

The displaceable structure 304 is composed of the displaceable members 310, 311, wherein the IR-absorption layer 351 is mounted to the displaceable structure 304. The planar member 350 serves both as an IR reflector and as a movable electrode.

If IR radiation i is incident from above, then the IR absorption layer 351 absorbs the IR radiation i and generates heat. (The interference phenomenon described above with respect to the FIG. 32(b) embodiment also occurs with this embodiment, which contributes to the amount of heat generated.) The heat is conducted to the displaceable members 310, 311, causing the displaceable members 310, 311 to bend downward. Thus, whereas the relative positional relationship (i.e., distance L1) between the planar member 350 and the IR-absorption layer 351 is maintained, the planar member 350 tilts toward the substrate 301. The degree of tilt corresponds to the amount of IR radiation i absorbed. As a result, the distance between the fixed electrode 353 and the planar member 350 (the latter serving as a movable electrode) changes, causing the capacitance between the planar member 350 and the fixed electrode 353 to change. Hence, the amount of incident IR radiation i absorbed is detected as a corresponding change in capacitance from the diffusion zones 354, 355. The diffusion zones 354, 355 are connected to a readout circuit (not shown). The readout circuit provides data useful for forming a display of the IR image.

Pixels including the displaceable structure 304; legs 302, 303; and the fixed electrode 353 are regarded as respective unit elements of the detector 700 and are arranged on the substrate 301 in a one- or two-dimensional array.

A detector according to this embodiment also provides advantages as described above with respect to the FIG. 32(b) embodiment. The radiation detector 700 can be fabricated using semiconductor-fabrication technology including layer forming and patterning, as well as forming and removal of sacrificial layers.

Representative Embodiment 10

A capacitor-type radiation detector 800 according to this embodiment is shown in FIG. 39 that provides a schematic elevational section of a representative pixel (unit element) of the detector 800. The view shown in FIG. 39 is similar to the view shown in FIG. 38(b). In FIG. 39, components that are the same as respective components in FIG. 38(b) have the same respective reference numerals and are not described further. The following discussion is directed to the differences of this embodiment from the FIG. 38(b) embodiment.

In the radiation detector 800, the IR-absorption layer 351 of the FIG. 38(*b*) embodiment is absent. Also, instead of the planar member 350 used in the FIG. 38(*b*) embodiment, the FIG. 39 embodiment comprises a planar member 360 serving both as a movable electrode and as an IR-absorber. The IR-absorber reflects a portion of the incident IR radiation i. The planar member 360 is attached to the displaceable members 310, 311. The fixed electrode 353 serves both as a capacitor electrode and as a reflector that totally reflects IR radiation. The distance between the planar member 360 and the fixed electrode 353 is L1. The planar member 360 is formed of, for example, a metal oxide layer such as an "ITO" layer, or the like.

Since the fixed electrode 353 is affixed to the substrate 301, the distance L1 changes with displacements of the displaceable structure 304. As a result, the stability of the spectral-response characteristic of this embodiment is less than the previous embodiment. However, other advantages as noted above for the other representative embodiments are realized with this embodiment.

Each of the embodiments described above is intended as an example only and is not to be regarded as limiting in any way. This includes any disclosure above concerning materials and dimensions.

Whereas the invention has been described above in connection with multiple representative embodiments, it will be understood that the invention is not limited to those embodiments. On the contrary, the invention is intended to encompass all modifications, alternatives, and equivalents as may be included within the spirit and scope of the invention as defined by the appended claims.

What is claimed is:

1. In a radiation detector, a detection element comprising a displaceable member comprising a planar portion comprising at least one membrane layer, the planar portion being supported relative to a substrate of the radiation detector such that the planar portion is displaced from the substrate, the planar portion having a periphery and being edged by a dropping portion on at least a portion of the periphery of the planar portion.

2. The radiation detector of claim 1, wherein the dropping portion is perpendicular to the planar portion.

3. The radiation detector of claim 1, wherein the planar portion includes a reflector of signal light.

4. The radiation detector of claim 1, wherein the displaceable member includes a region that absorbs radiation to be detected by the detector.

5. The radiation detector of claim 4, wherein the radiation-absorbing region absorbs infrared radiation.

6. In a radiation detector, a detection element comprising a displaceable member comprising a planar portion comprising at least first and second superposed membrane layers, the planar portion being supported relative to a substrate of the radiation detector such that the planar portion is displaced from the substrate, at least one of the membrane layers being configured to cover at least a portion of a peripheral edge of the other membrane layer.

7. The radiation detector of claim 3, wherein:
the planar portion comprises at least three membrane layers; and
the first membrane layer includes a dropping portion that covers the peripheral edge of at least one of the remaining membrane layers.

8. In a radiation detector, a detection element comprising a displaceable member supported relative to a substrate of the radiation detector, the displaceable member being mounted to a leg that is mounted to the substrate, the leg comprising a layer including a horizontal portion and a dropping portion extending around at least a portion of a peripheral edge of the horizontal portion.

9. A radiation detector, comprising:
a substrate;
a displaceable member supported relative to the substrate so as to be displaced from the substrate, the displaceable member exhibiting a change in the displacement in response to heat absorbed by the displaceable member; and
a displacement readout member attached to the displaceable member, the readout member providing a readout of data corresponding to a displacement of the displaceable member relative to the substrate, the displacement readout member being situated at a distance upstream or downstream of the displaceable member and comprising a membrane layer.

10. The radiation detector of claim 9, wherein the displacement readout member provides a readout corresponding to a condition of signal light reflecting from the displacement readout member.

11. The radiation detector of claim 9, wherein the displacement readout member provides a readout corresponding to a condition of electrical capacitance as a function of displacement of the displacement readout member.

12. A thermal-type displaceable element for a radiation detector, the displaceable element comprising:
a displaceable structure supported relative to a substrate so as to be situated a pre-determined distance from the substrate, the displaceable structure being configured to exhibit a displacement relative to the substrate in response to absorbing an amount of heat;
the displaceable structure comprising at least one connecting member and multiple linearly extended independently displaceable members each comprising at least two superposed membrane layers having mutually different coefficients of thermal expansion;
the independently displaceable members being arranged parallel with each other and being connected together such that an end of each independently displaceable member is connected to the substrate or connected to another independently displaceable member via a respective connecting member to form a connecting structure, between the substrate and the displaceable structure, comprising multiple independently displaceable members connected together between the substrate and the displaceable structure, the connecting structure holding the displaceable structure at a distance from the substrate; and
wherein each connecting member comprising at last one membrane layer, and an end of at least one displaceable member is connected to the substrate and an end of another displaceable member is connected to the displaceable structure.

13. The displaceable element of claim 12, wherein the displaceable structure includes a reflector of signal light.

14. The displaceable element of claim 12, wherein the independently displaceable members include respective regions that absorb incident light to be detected.

15. The displaceable element of claim 14, wherein the regions absorb incident infrared light.

16. The displaceable element of claim 12, wherein:
the independently displaceable members are connected together such that each can be denoted as an $N^{th}$-stage displaceable member that precedes an $(N+1)^{th}$-stage displaceable member;

the independently displaceable members are connected together such that a number of independently displaceable members connecting the displaceable structure to the substrate is at a minimum;

an end of each $N^{th}$-stage displaceable member and a corresponding end of each $(N+1)^{th}$-stage displaceable member are situated so as to be connected together by a respective connecting member oriented perpendicularly to the displaceable members connected to it; and the membrane layers of each independently displaceable member have respective coefficients of thermal expansion, wherein the layers in the $N^{th}$-stage displaceable member are stacked in an order that is opposite an order with which the layers are stacked in the $(N+1)^{th}$-stage displaceable member.

17. A radiation detector, comprising:

a thermal-type displaceable element comprising multiple stages of independently displaceable elements connected together; and a displaceable readout element attached to a final-stage independently displacement element, the readout element exhibiting a change in a readout parameter in response to a displacement imparted to the readout element by the final-stage independently displaceable element; and wherein each stage of the independently displaceable members exhibits heating upon receiving incident radiation.

18. The radiation detector of claim 1, wherein the displaceable member further comprises a radiation-absorbing region that absorbs incident radiation and exhibits heating in response to an amount of absorbed incident radiation, the heating causing a corresponding change in displacement of the displaceable member relative to the substrate, and the radiation-absorbing region reflecting a portion of the incident radiation; and a radiation-reflector situated a distance of $n\lambda_0/4$ from the radiation-absorbing region, wherein n is an odd integer, and $\lambda_0$ is a median wavelength of the incident radiation.

19. The radiation detector of claim 18, wherein the displaceable structure includes the radiation-reflector having a constant positional relationship with the radiation-absorbing region, notwithstanding any displacement of the displaceable structure.

20. The radiation detector of claim 19, wherein the displaceable structure includes a readout-light reflector configured to reflect readout light incident on the readout-light reflector.

21. The radiation detector of claim 19, wherein the substrate includes a fixed electrode and the displaceable structure includes a movable electrode facing the fixed electrode; and the radiation reflector serves both as a reflector and the movable electrode or comprises the movable electrode.

22. The radiation detector of claim 18, wherein the substrate includes a fixed electrode and the displaceable portion includes a movable electrode facing the fixed electrode; and the radiation reflector serves both as a reflector and the fixed electrode.

23. The radiation detector of claim 18, wherein the substrate includes a fixed electrode and the displaceable structure includes a movable electrode facing the fixed electrode; and the radiation reflector serves both as a reflector and the movable electrode.

* * * * *

UNITED STATES PATENT AND TRADEMARK OFFICE
CERTIFICATE OF CORRECTION

PATENT NO. : 6,469,301 B1
DATED : October 22, 2002
INVENTOR(S) : Suzuki et al.

It is certified that error appears in the above-identified patent and that said Letters Patent is hereby corrected as shown below:

<u>Title page,</u>
Item [56], References Cited, OTHER PUBLICATIONS, "Barnes et al." reference, "woth" should be -- with --; and "1997" should be -- 1994 --.

<u>Column 7,</u>
Line 58, "FIGS. 1(a)-(b)" should be -- FIGS. 1(a)-1(b) --.
Line 62, "FIGS. 2(a)-(d)" should be -- FIGS. 2(a)-2(d) --.

<u>Column 8,</u>
Line 55, "is schematic" should be -- is a schematic --.

<u>Column 11,</u>
Line 27, "exaporative" should be -- evaporative--.

Signed and Sealed this

Twentieth Day of January, 2004

JON W. DUDAS
*Acting Director of the United States Patent and Trademark Office*